US011186752B2

(12) United States Patent
Ayambem et al.

(10) Patent No.: US 11,186,752 B2
(45) Date of Patent: *Nov. 30, 2021

(54) LOW-DUST PRODUCTS USING MICROCRYSTALLINE WAX EMULSION

(71) Applicant: Henry Company, LLC, El Segundo, CA (US)

(72) Inventors: Amba Ayambem, Kimberton, PA (US); Daniel Kent, Phoenixville, PA (US)

(73) Assignee: Henry Company, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,507

(22) Filed: Aug. 5, 2019

(65) Prior Publication Data

US 2020/0131411 A1 Apr. 30, 2020

Related U.S. Application Data

(63) Continuation of application No. 15/274,258, filed on Sep. 23, 2016, now Pat. No. 10,370,566.

(60) Provisional application No. 62/232,032, filed on Sep. 24, 2015.

(51) Int. Cl.
| | | |
|---|---|---|
| *C09J 9/00* | (2006.01) | |
| *C09D 5/34* | (2006.01) | |
| *C09K 3/10* | (2006.01) | |
| *B32B 37/12* | (2006.01) | |
| *C08K 5/01* | (2006.01) | |
| *C09J 5/00* | (2006.01) | |
| *C09J 11/06* | (2006.01) | |
| *C09J 11/08* | (2006.01) | |
| *C09J 129/04* | (2006.01) | |
| *C09K 3/22* | (2006.01) | |

(52) U.S. Cl.
CPC ............... *C09J 9/00* (2013.01); *B32B 37/12* (2013.01); *C08K 5/01* (2013.01); *C09D 5/34* (2013.01); *C09J 5/00* (2013.01); *C09J 11/06* (2013.01); *C09J 11/08* (2013.01); *C09J 129/04* (2013.01); *C09K 3/10* (2013.01); *C09K 3/22* (2013.01); *B32B 2607/00* (2013.01); *C09J 2301/408* (2020.08)

(58) Field of Classification Search
CPC ............... C08L 91/06; C08L 2205/025; C08L 2205/035; C08L 29/04; C09D 5/34; C09D 131/04; C09D 123/8053; C09D 7/65; C09D 191/08; C08K 9/22; C04B 26/06; C09J 9/00; C09J 11/06; C09J 11/08; C09J 129/04; B32B 2607/00; C09K 3/10; E04F 21/1652; E04F 13/0889; E04F 21/165
USPC .......................................... 156/326; 523/201
See application file for complete search history.

(56) References Cited

U.S. PATENT DOCUMENTS

| | | | |
|---|---|---|---|
| 4,294,622 | A | 10/1981 | Brown |
| 4,370,167 | A | 1/1983 | Mudd |
| 4,391,648 | A | 7/1983 | Ferrill, Jr. |
| 4,454,267 | A | 6/1984 | Williams |
| 4,525,388 | A | 6/1985 | Rehder et al. |
| 4,686,253 | A | 8/1987 | Struss et al. |
| 4,782,632 | A | 11/1988 | Matechuk |
| 4,846,887 | A | 7/1989 | Kuehnle |
| 4,955,748 | A | 9/1990 | Krumholz |
| 4,972,013 | A | 11/1990 | Koltisko, Jr. et al. |
| 5,277,712 | A | 1/1994 | McInnis |
| 5,336,318 | A | 8/1994 | Attard et al. |
| 5,746,822 | A | 5/1998 | Espinoza et al. |
| 5,779,786 | A | 7/1998 | Patel |
| 6,358,309 | B1* | 3/2002 | Langford ................ C04B 26/02 106/661 |
| 6,406,537 | B1 | 6/2002 | Immordino |
| 6,476,099 | B1 | 11/2002 | Cimaglio et al. |
| 6,545,066 | B1 | 4/2003 | Immordino, Jr. et al. |
| 6,663,707 | B2 | 12/2003 | Wantling et al. |
| 6,890,976 | B2 | 5/2005 | Sinnige |
| 7,052,544 | B2 | 5/2006 | Langford |
| 7,192,909 | B2 | 3/2007 | Richter et al. |
| 8,241,415 | B2 | 8/2012 | Wantling et al. |
| 8,329,785 | B2 | 12/2012 | Langford |
| 8,669,401 | B2 | 3/2014 | Hassan et al. |
| 8,673,071 | B2* | 3/2014 | Immordino, Jr. ... C04B 40/0042 106/778 |
| 10,329,203 | B2* | 6/2019 | Ayambem ........... C04B 20/1033 |
| 10,801,217 | B2* | 10/2020 | Ayambem ........... C09D 191/08 |
| 2004/0083928 | A1 | 5/2004 | Shoshany |
| 2006/0196391 | A1 | 9/2006 | Hassan et al. |
| 2007/0181035 | A1 | 8/2007 | Wantling et al. |
| 2007/0245931 | A1 | 10/2007 | Wantling |
| 2007/0246683 | A1* | 10/2007 | Miller .................... C04B 28/141 252/88.1 |
| 2008/0141909 | A1 | 6/2008 | Immordino et al. |
| 2009/0227451 | A1 | 9/2009 | Rose et al. |
| 2009/0229736 | A1 | 9/2009 | Bonetto et al. |
| 2011/0049417 | A1 | 3/2011 | Swift et al. |
| 2011/0065839 | A1 | 3/2011 | Ayambem et al. |
| 2011/0172094 | A1 | 7/2011 | Deng et al. |
| 2012/0263963 | A1 | 10/2012 | Mahoney et al. |
| 2014/0352866 | A1 | 12/2014 | Ayambem et al. |
| 2015/0158999 | A1 | 6/2015 | Ayambem et al. |
| 2016/0376798 | A1 | 12/2016 | Ayambem |
| 2017/0275479 | A1 | 9/2017 | Ayambem |
| 2017/0362482 | A1 | 12/2017 | Ayambem et al. |
| 2020/0123407 | A1* | 4/2020 | Ayambem ................ C09D 5/34 |

* cited by examiner

*Primary Examiner* — Hannah J Pak
(74) *Attorney, Agent, or Firm* — BakerHostetler

(57) ABSTRACT

The present invention relates generally to wall repair compounds such as joint compounds, spackling compounds, and the like used to repair imperfections in walls or fill joints between adjacent wallboard panels. Particularly, the present invention relates to such a wall repair compound comprising a dust reducing additive that reduces the quantity of airborne dust generated when the hardened compound is sanded. The dust reducing additive also imparts adhesion to the wall repair compounds to which it is added, for example to a joint compound. The dust reducing additive comprises microcrystalline-wax based emulsion.

22 Claims, 5 Drawing Sheets

LOW-DUST PRODUCTS USING MICROCRYSTALLINE WAX EMULSION

CROSS REFERENCE TO RELATED APPLICATIONS

This application is continuation of U.S. application Ser. No. 15/274,258, filed Sep. 23, 2016, which claims the benefit from U.S. Provisional Application No. 62/232,032, filed on Sep. 24, 2015 the contents of which are hereby incorporated by reference as if set forth in its entirety herein.

TECHNICAL FIELD

The present invention relates generally to wall repair compounds such as joint compounds, spackling compounds, and the like used to repair imperfections in walls or fill joints between adjacent wallboard panels. Particularly, the present invention relates to such a wall repair compound comprising a dust reducing additive that reduces the quantity of airborne dust generated when the hardened compound is sanded. The dust reducing additive also imparts adhesion to the wall repair compounds to which it is added, for example to a joint compound. The dust reducing additive comprises microcrystalline-wax based emulsion.

BACKGROUND

Interior walls of residential and commercial buildings are often constructed using gypsum wallboard panels, often referred to simply as "wallboard" or "drywall." The wallboard panels are attached to studs using nails or other fasteners, and the joints between adjacent wallboard panels are filled using a specially formulated adhesive composition called joint compound to conceal the joints.

The procedure for concealing the joint between adjacent wallboards, and thereby producing a smooth seamless wall surface, typically includes applying soft, wet, joint compound within the joint or seam formed by the abutting edges of adjacent wallboard panels using a trowel or the like. A fiberglass, cloth, or paper reinforcing tape material is then embedded within the wet joint compound, and the compound is allowed to harden. After the joint compound has hardened, a second layer of joint compound is applied over the joint and tape to completely fill the joint and provide a smooth surface. This layer is also allowed to harden. Upon hardening, the joint compound is sanded smooth to eliminate surface irregularities. Paint or a wall covering, such as wall paper, can then be applied over the joint compound so that the joint and the drywall compound are imperceptible under the paint or wall covering. The same joint compound can also be used to conceal defects caused by the nails or screws used to affix the wallboard panels to the studs, or to repair other imperfections in the wallboard panels, so as to impart a continuously smooth appearance to the wall surface.

Various drywall joint compounds are known for concealing joints between adjacent wallboard panels. Conventional joint compounds typically include a filler material and a binder. Conventional fillers are calcium carbonate and calcium sulfate dihydrate (gypsum), which are used in "ready mixed" joint compounds, and calcium sulfate hemihydrate ($CaSO_4 \cdot \frac{1}{2}H_2O$; also referred to as plaster-of-Paris or calcined gypsum), which is used in "setting type" joint compounds. Ready mixed joint compounds, which are also referred to as pre-mixed or drying type joint compounds, are pre-mixed with water during manufacturing and require little or no addition of water at the job site. Such joint compounds harden when the water evaporates and the compound dries. Setting type joint compounds, on the other hand, harden upon being mixed with water, thereby causing dihydrate crystals to form and interlock. Setting type joint compounds are therefore typically supplied to the job site in the form of a dry powder to which the user then adds a sufficient amount of water to give the compound a suitable consistency.

The Koltisko, Jr. et al. U.S. Pat. No. 4,972,013 provides an example of a readymixed (wet) joint compound including a filler, binder, thickener, non-leveling agent, and water. The McInnis U.S. Pat. No. 5,277,712 provides an example of a setting (dry mix-type) joint compound including a fine plaster material, such as stucco (a material which imparts internal strength) and methyl cellulose (which provides workability and water retention) to the joint compound. Additional examples of joint compounds are provided in the Brown U.S. Pat. No. 4,294,622; the Mudd U.S. Pat. No. 4,370,167; the Williams U.S. Pat. No. 4,454,267; the Struss et al. U.S. Pat. No. 4,686,253; the Attard et al. U.S. Pat. No. 5,336,318; and the U.S. Pat. No. 5,779,786.

A spackling compound is disclosed in the Deer et al. U.S. Pat. No. 4,391,648. While joint compound and spackling compound do many of the same things and are both smeared onto walls to hide flaws, spackling compound is generally lighter, dries more quickly, sands more easily, and is more expensive than joint compound. For simplicity, joint compound, drywall joint compound, and like expressions are used throughout this specification to refer to wall repair compounds generally, including joint compound and spackling compound.

Sanding hardened joint compound can be accomplished using conventional techniques including power sanders, abrasive screens, or manual sanders which consist simply of a supporting block and a piece of abrasive paper mounted on the block. Sanding the joint compound, however, produces a large quantity of an extremely fine powder which tends to become suspended in air for a long period of time. The airborne particles settle on everything in the vicinity of the sanding site and usually require several cleanings before they can all be collected, thereby making cleanup a time consuming and tedious process. The particles may also present a serious health hazard to the worker.

The airborne particles are highly pervasive and can enter the nose, lungs, eyes and even the pores of the skin. Results from a study conducted by the National Institute for Occupational Safety and Health found that dust levels in 9 out of 10 test samples taken at test sites where workers were finishing drywall with joint compound were higher than the limits set by OSHA. The report also said that the dust may not be safe even when it falls within the recommended limits. In addition, the study found that several dust samples contained silica and kaolin, material founds in clay that have been found to cause permanent lung damage. The report recommended the use of local exhaust ventilation, wet finishing techniques, and personal protective equipment to reduce the hazard.

In an effort to reduce the dust generation and cleanup problems associated with the sanding of conventional joint compounds, various attempts have been made to develop specialized dustless drywall sanders. The Matechuk U.S. Pat. No. 4,782,632, for example, discloses a drywall sander including a sanding head designed to minimize the release of dust and further discloses attaching a vacuum cleaner to the sanding head to collect the dust. The Krumholz U.S. Pat. No.

4,955,748 discloses a dustless drywall finisher which uses a wet sponge to prevent the formation of airborne dust.

Dust remains a problem, however, when conventional power sanders or hand sanders are used to sand conventional joint compounds. A need therefore exists for a joint compound that can be sanded using conventional sanders without producing a large quantity of fine particles capable of becoming suspended in air. It would also be desirable to provide an additive that could be mixed with commercially available joint compounds to inhibit the formation of airborne particles during the sanding procedure without otherwise interfering with the properties of the joint compound.

The composition of the present invention addresses the above discussed problems of dust generation. The emulsion of the present invention comprising colloidally-protected, microcrystalline-wax-based microstructure can be added to a wall repair com-pound, for example, a joint compound to serve as a dust reducing additive.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present invention provides a wall repair compound, such as a joint compound or spackling compound which, when sanded, generates a lower level of airborne particles than conventional joint compounds. In addition, the joint compound of the present invention is also water resistant and has excellent adhesive properties.

More specifically, the present invention provides a wall repair compound which includes a dust-reduction additive. Generally, the wall repair or joint compound includes a sufficient amount of the dust-reduction additive so that when the joint compound is tested as described in this specification, it generates a lower quantity of airborne dust than the joint compound would produce if it did not contain the dust-reduction additive.

Disclosed herein are embodiments of a low-dust joint compound which can comprise water, preservative, and dust-reduction additive ("DRA"), which is a wax emulsion comprising colloidally-protected microcrystalline-wax-based ("CMWB") microstructures. The DRA can be premixed into the wet joint compound prior to application. Generally, the dustreduction additive reduces the quantity of airborne dust particles having a size of less than or equal to 10 microns to less than 50% of the quantity that would be generated without the additive. In certain embodiments, the quantity of airborne dust particles is reduced by at least 75% compared to a mixture without the additive. Most preferably, the level of airborne dust is reduced by more than 90%. In one embodiment, the quantity of airborne particles generated by sanding the hardened joint compound of the present invention was less than 50 mg/m3 and, in certain other embodiments, less than about 20 mg/m3. The quantity of airborne particles generated by sanding the hardened joint compound is preferably less than 20 mg/m3.

It is desirable that the dust-reduction additive serve to suppress the formation of airborne particles without significantly interfering with the desired characteristics of the joint compound. The present invention in fact discloses a joint compound that has a synergistic combination of improved dust generation property, improved water resistance, and improved adhesive property.

The joint compound formulations include a conventional filler material and a binder material, such as a resin. The joint compound can also include a surfactant, which may or may not serve to suppress airborne dust formation, and a thickening agent. Prior to hardening, the joint compound preferably includes a sufficient amount of water to form a mud-like spreadable material which can be applied to the wall surface. The present invention further provides an additive which can be admixed with conventional joint compounds to reduce the quantity of dust generated during sanding. The dust-reduction additive can be used with both drying type (i.e., ready mixed) or setting type joint compounds.

The present invention also provides a method of reducing the quantity of airborne dust generated by sanding a fully hardened joint compound which includes mixing a sufficient quantity of a dust-reduction additive with the joint compound prior to applying the joint compound to a wall surface.

In some embodiments, the joint compound can comprise the dust-reduction additive emulsion and can have a contact angle of about 90 to about 130 degrees, a pH below 12, and a Cobb value of about 1.0 to about 1000 grams per square meter.

In some embodiments, the joint compound can further comprise a rheology modifier, a binder, a thickener, and a filler. In some embodiments, the joint compound can further comprise calcium carbonate, or cristobalite, or a micro-roughened filler, or gypsum, or mica, or clay, or thickener, or a latex binder, or talc, or perlite, or expanded perlite, or combinations thereof. In some embodiments, the joint compound can comprise the low-dust wax emulsion which can comprise water, polyvinyl alcohol, microcrystalline-wax, or montan wax, or synthetic wax, or combinations thereof, a base, and a dispersant.

This invention also relates to a low-dust wax emulsion, the wax emulsion comprising colloidally-protected, microcrystalline-wax-based microstructure that has microcrystalline-wax chemically tethered to an emulsifier such as montan wax, a wax containing organic acids and/or esters, or an emulsifier containing a mixture of organic acids such as stearic acid and/or esters, or combinations thereof, the emulsifier, in turn, chemically tethered to a stabilizer polyvinyl alcohol, wherein the PVOH forms an encapsulation around the microcrystalline-wax.

In some embodiments, the joint compound shows a peak airborne dust production being reduced from about 10% to about 98% compared to the commercially available joint compound dust reduction additive.

In some embodiments, the joint compound can have a pH below 9. In some embodiments, the joint compound can have a contact angle of about 60 to about 130 degrees. In some embodiments, the joint compound can be generally hydrophobic and can have a contact angle of about 110 to about 130 degrees. In some embodiments, the joint compound can have a Cobb value of about 1.0 to about 1000 grams per square meter. In some embodiments, the joint compound can have a Cobb value of about 65 grams per square meter.

In some embodiments, the joint compound can further comprise a rheology modifier, a binder, a thickener, and a filler. In some embodiments, the joint compound can further comprise calcium carbonate, or cristobalite, or a micro-roughened filler, or gypsum, or mica, or clay, or thickener, or a latex binder, or talc, or perlite, or expanded perlite, or combinations thereof. In some embodiments, the joint compound can comprise wax emulsion stabilized with polyvinyl alcohol. In some embodiments, the joint compound can comprise wax emulsion comprising synthetic wax. In some embodiments, the joint compound can comprise wax emulsion, the wax emulsion can comprise synthetic wax including polyethylene glycol or methoxypolyethylene glycol, or both polyethylene glycol and methoxypolyethylene glycol.

In some embodiments, the joint compound can comprise wax emulsion and silicones, or siloxanes, or siliconates, or fluorinated compounds, or stearates, or combinations thereof.

In some embodiments, the joint compound can comprise wax emulsion, the wax emulsion can be formed by mixing a combination of water, polyvinyl alcohol, and microcrystalline-wax, or montan wax, or synthetic wax, or combinations thereof.

In some embodiments, the joint compound can comprise the low-dust wax emulsion and silicones, or siliconates, or fluorinated compounds, or stearates, or combinations thereof. In some embodiments, the silicones, siliconates, fluorinated compounds, or stearates can be selected from the group consisting of metal siliconate salts, potassium siliconate, poly hydrogen methyl siloxane, polydimethyl siloxane, stearate-based salts, and combinations thereof.

In some embodiments, the joint compound can comprise the wax emulsion and optionally at least one thickener, preferably a cellulose ether based thickener.

More specifically, this invention relates to a low-dust joint compound composition comprising:
(i) a dust reduction additive emulsion comprising colloidally-protected microcrystalline-wax-based (CMWB) microstructures; and
(ii) a first water.

In one embodiment, this invention further relates to the low-dust joint compound composition as recited above, wherein said dust reduction additive emulsion comprises said CMWB microstructure comprising:
(A) a wax core,
wherein said wax core comprises a microcrystalline-wax component and a non-microcrystalline-wax component,
wherein said microcrystalline-wax component comprises at least one linear alkane wax defined by the general formula $CnH2n+2$, where n ranges from 13-80,
wherein said non-microcrystalline-wax component comprises at least one wax selected from the group consisting of animal-based wax, plant-based wax, mineral wax, synthetic wax, a wax containing organic acids and/or esters, anhydrides, an emulsifier containing a mixture of organic acids and/or esters, and combinations thereof; and
(B) a polymeric shell,
wherein said polymeric shell comprises at least one polymer selected from polyvinyl alcohol, polyvinyl alcohol copolymers, polyvinyl alcohol terpolymers, polyvinyl acetate, polyvinyl acetate copolymers, polyvinyl acetate terpolymers, cellulose ethers, polyethylene oxide, polyethyleneimines, polyvinylpyrrolidone, polyvinylpyrrolidone copolymers, polyethylene glycol, polyacrylamides and poly(N-isopropylamides), pullulan, sodium alginate, gelatin, starches, and combinations thereof.

In one embodiment, this invention also relates to the low-dust joint com-pound composition as recited above, wherein said polymeric shell comprises polyvinyl alcohol.

In yet another embodiment, this invention relates to the low-dust joint compound composition as recited above, further comprising at least one component from a filler; a binder; a thickener; a non-leveling agent; a preservative; a rheology modifier; and a surfactant.

In another embodiment, this invention relates to the low-dust joint compound composition as recited above, wherein:
said filler is selected from calcium carbonate ($CaCO_3$), calcium sulfate dihydrate ($CaSO_4 2H_2O$), calcium sulfate hemihydrate ($CaSO_4\text{-}\frac{1}{2}H_2O$), glass micro bubbles, mica, perlite, talc, limestone, pyrophyllite, silica, diatomaceous earth, and combinations thereof; said binder is selected from polyvinyl acetate, polyvinyl alcohol, ethylene vinyl acetate co-polymer, vinylacrylic copolymer, styrenebutadiene, polyacrylamide, acrylic polymers, latex, natural starch, synthetic starch, casein, and combinations thereof; said thickener is selected from methyl cellulose, hydroxypropyl cellulose, hydroxypropyl methyl cellulose, hydroxyethyl cellulose, hydroxyethyl methyl cellulose, hydroxyethyl hydroxypropyl cellulose, ethyl hydroxyethyl cellulose, sodium carboxymethyl cellulose, and combinations thereof; and
said non-leveling agent is selected from attapulgite clay, bentonite, illite, kaolin, sepiolite, clays mixed with starches, and combinations thereof.

In yet another embodiment, this invention relates to the low-dust joint compound composition as recited above, further comprising at least one of cristobalite, a microroughened filler, clay, expanded perlite, and combinations thereof.

In one embodiment, this invention relates to the low-dust joint compound composition as recited above, wherein said dust-reduction additive emulsion further comprises a second water; a base; and a dispersant.

In other embodiment, this invention relates to the low-dust joint compound composition as recited above, wherein said dispersant is selected from a dispersant having sulfur; a dispersant having a sulfur-containing group in the compound; sulfonic acid ($R\text{—}S(=O)2\text{-}OH$); sulfonic acid salts, wherein the R groups is functionalized with hydroxyl, or carboxyl; lignosulfonate; lignosulfonic acid; naphthalene sulfonic acid; sulfonate salt of lignosulfonic acid; sulfonate salt of naphthalene sulfonic acid; derivatized lignosulfonic acid; derivatized naphthalene sulfonic acid; functionalized lignosulfonic acid; functionalized naphthalene sulfonic acid; magnesium sulfate; polycarboxylate; ammonium hepta molybdate; combination of ammonium hepta molybdate and starch; alkyl quaternary ammonium; montmorillonite clay; non-ionic surfactants; ionic surfactants; zwitterionic surfactants; and mixtures thereof.

In yet another embodiment, this invention relates to the low-dust joint compound composition as recited above, wherein said base is selected from monoethanol amine; diethanol amine; triethanol amine; imidazole; potassium siliconate; and combinations thereof.

In one embodiment, this invention relates to the low-dust joint compound composition as recited above, wherein the weight of said dust reduction additive emulsion is in the range of from about 0.1% to about 20% by weight of said low-dust joint compound composition.

In another embodiment, this invention relates to the low-dust joint com-pound composition as recited above, wherein the weight of said dust reduction additive emulsion is in the range of from about 0.1% to about 10% by weight of said low-dust joint compound composition.

In another embodiment, this invention relates to the low-dust joint com-pound composition as recited above, wherein the peak air-borne dust generation of said low-dust joint compound is less than 100 mg/m3.

In yet another embodiment, this invention relates to the low-dust joint compound composition as recited above, wherein the quantity of dust generated upon sanding of said low-dust joint compound composition is reduced at least by 5%.

In another embodiment, this invention relates to the low-dust joint com-pound composition as recited above, wherein the quantity of dust generated upon sanding of said low-dust joint compound composition is reduced at least by 80%.

In one embodiment, this invention relates to the low-dust joint compound composition as recited above, further comprising at least one component from a silicone, a siliconate, a fluorinated compound, a stearate, or a combination thereof.

In yet another embodiment, this invention relates to the low-dust joint compound composition as recited above, wherein the silicones, siliconates, fluorinated compounds, or stearates are selected from the group consisting of metal siliconate salts, potassium siliconate, poly hydrogen methyl siloxane, polydimethyl siloxane, stearate-based salts, and combinations thereof.

In one embodiment, this invention relates to a method of using said low-dust joint compound composition as recited above, said method comprising:
  (I) applying said composition to a joint between adjacent wallboard panels;
  (II) allowing said composition to dry; and
  (III) sanding said dried composition.

In another embodiment, this invention relates to a method of using said low-dust joint compound composition as recited above, said method for reducing the quantity of dust generated by a joint-compound composition, said method comprising the steps of:
  (I) providing a joint-compound composition comprising a filler, a first water, binder, and at least one of a defoamer, wetting agent, preservative, fungicide, thickener, non-leveling agent, surfactant, and a solvent; and
  (II) subsequently adding a sufficient quantity of a dust-reduction additive emulsion as described previously to said joint-compound composition to reduce the quantity of dust generated by sanding the hardened joint-compound composition by at least 5%.

In one embodiment, this invention relates to a method for reducing the quantity of dust generated by a joint-compound as recited above, wherein the quantity of dust generated by sanding said hardened drywall joint-compound is reduced by at least 80%.

In yet another embodiment, this invention relates to a method for reducing the quantity of dust generated by a joint-compound as recited above, wherein said joint compound composition has a contact angle of about 60° to about 150°; and/or wherein said joint compound composition has a Cobb value of about 5.0 to about 100 g/m².

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION OF ILLUSTRATIVE EMBODIMENTS

Figure 1:
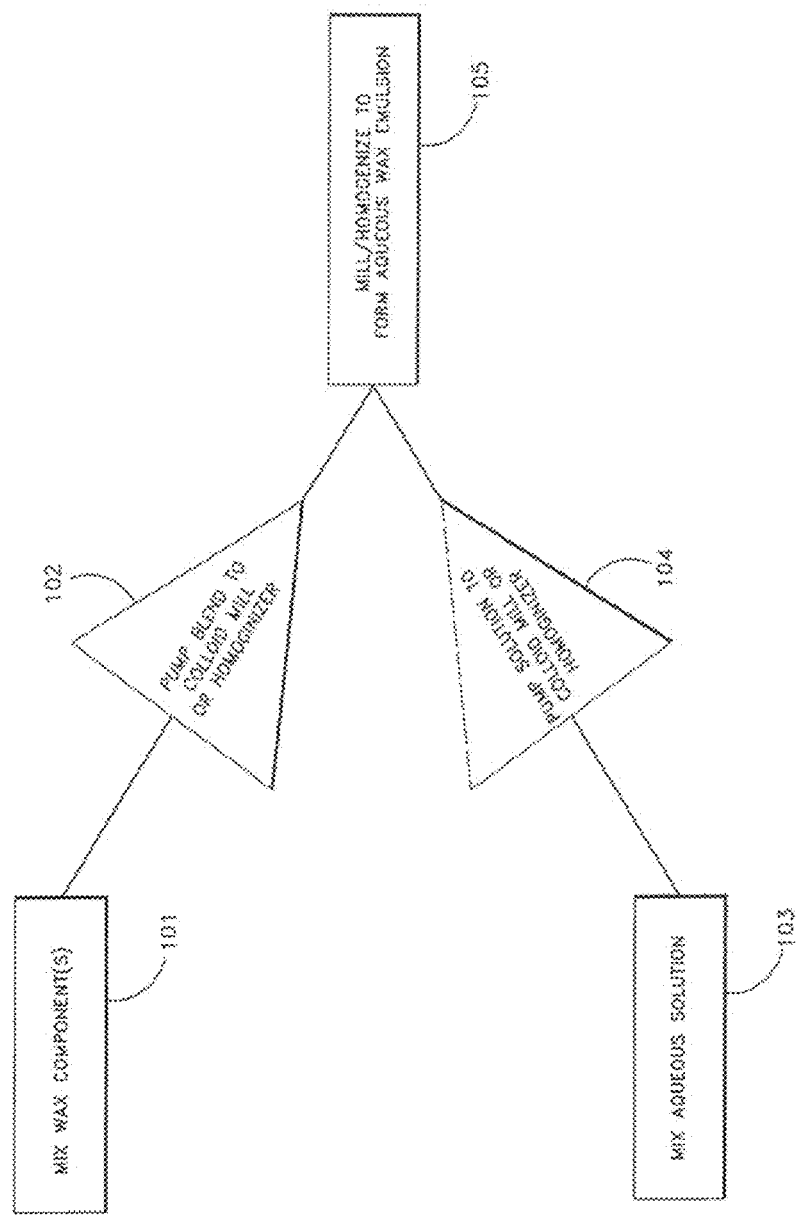
FIG. 1 illustrates an example process of one embodiment of the disclosure.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

General Embodiments

Embodiments of the present disclosure provide a dust reduction additive ("DRA") comprising colloidally-protected, microcrystalline-wax-based ("CMWB") microstructures in an emulsion form. In another embodiment, the present invention relates to the process of preparing such dust reducing additive emulsions. Dust reducing additive refers to any ingredient capable of preventing, minimizing, suppressing, reducing, or inhibiting the formation of particles capable of becoming airborne.

The expressions "airborne particles" or "airborne dust particles" refer to fine particles generated during the sanding or abrading of the compound which are capable of being carried by or through the air. Wall repair compound refers generally to compositions useful for filling and repairing cracks, holes, and other imperfections in surfaces such as drywall, wood, plaster, and masonry.

Wall repair compounds include interior finishing and patch compounds such as joint compound, spackling compound, wood fillers, plasters, stucco, and the like. The joint compound can also include a thickener, and other materials found in conventional joint compounds. While the disclosure infra describes the DRA of the present invention in the context of a joint compound, the DRA emulsion can also be used with other wall-repair compounds.

The present invention also relates to low-dust joint compounds comprising the dust reducing additive and methods for preparing such low-dust joint compounds. By "low-dust joint compound" is meant a joint compound comprising DRA emulsion in which the dust formation in form of airborne particles is lower than the same joint compound not comprising the DRA emulsion. According to the present invention, there are provided joint compound compositions suitable for filling and repairing cracks, holes, or other imperfections in a wall surface, such as the joints between adjacent wallboard panels. The compositions of the present invention include a dust reducing additive combined with conventional wall repair compound materials including a filler and a binder to form a low dust wall repair compound.

In addition to providing a low-dust property, the joint compound compositions of the present invention also provide adhesive properties to the joint compound to which it is added.

The joint compound may be used to create a low-dust barrier at wall joints, as well as at holes, such as nail holes, through a wall, thereby reducing the dust generated during processing of the joint compound and preventing moisture from passing through the walls. The joint compound may be used, for example, in construction of houses or commercial buildings.

In one embodiment, the joint compound comprises the dust reducing additive that comprises an activated montan and polyvinyl alcohol-stabilized microcrystalline-wax emulsion described further below. By doing so, the resulting dried joint compound surface can exhibit a low-dust environment and in some embodiments, even a high contact angle. Further, the disclosed joint compound formed from a wax emulsion can avoid deleterious effects on key desirable performance properties of the joint compound such as adhesion.

In accordance with a characterizing feature of the present invention, the joint compound comprises the DRA emulsion which minimizes the quantity of airborne particles generated, for example, during sanding of the hardened joint compound. The additive generally comprises less than 20% of the joint compound total wet weight. More preferably, the dust reducing additive comprises between about 0.1% and about 10% of the joint compound by wet weight percent and, most preferably, between about 0.5% and about 5% In one embodiment, the DRA is selected from any one of the following weight percentages:

0.1, 1, 2, 3, 4, 5, 6, 7, 8, 9, 10, 11, 12, 13, 14, 15, 16, 17, 18, 19, and 20.

The weight percentage of DRA emulsion in the joint compound can be any number within the range defined by any two numbers above, including the endpoints. The dust reducing additive of the present invention is described in detail infra.

Many ingredients have been found to effectively reduce the quantity of airborne particles generated when sanding the joint compound including oils such as animal, vegetable, and mineral oils (saturated and unsaturated), and oils derived from petroleum, pitch, natural and synthetic waxes, microcrystalline-wax, solvents which evaporate slower than water, terpenes, glycols, surfactants, and mixtures thereof. However, the CMWB microstructure based DRA emulsion of the present invention unlocks the synergistic effect of the three desired properties in the joint compound, namely: dust reducing property and adhesion.

While the manner by which each additive serves to suppress the formation of particles capable of becoming airborne is not fully understood, some general observations have been made. It is possible that the dust reducing additive may cause the dust particles to agglomerate or stick together, thereby forming large heavy particles which tend not to become or remain airborne. The invention, however, is not intended to be limited to any particular mechanism.

Dust Reducing Additive
Definitions

For the purposes of this invention, a "colloidal dispersion" is a dispersion of a discontinuous phase in a continuous phase, comprising colloidally-protected microcrystalline-wax-based microstructures.

By "wax" is meant any naturally occurring or synthetically occurring wax. It also includes blends or mixtures of one or more naturally occurring and/or synthetically occurring waxes. Those of animal origin typically consist of wax esters derived from a variety of carboxylic acids and fatty alcohols. The composition depends not only on species, but also on geographic location of the organism. Because they are mixtures, naturally produced waxes are softer and melt at lower temperatures than the pure components. Waxes are further discussed infra.

Microcrystalline-Wax

Generally, two chemically different waxy materials are extracted from crude oil: (1) paraffin wax or macro-wax; and (2) microcrystalline-wax. Microcrystalline-wax is a refined mixture of solid, saturated aliphatic hydrocarbons. It is characterized by a higher molecular weight branched molecular structure, longer hydrocarbon chains, and higher naphthenic hydrocarbon content, compared to the paraffin wax that contains mostly unbranched alkanes.

The microcrystalline-wax crystal structure is much finer than paraffin wax, which directly impacts many of the physical properties. Typical microcrystalline wax crystal structure is small and thin, making them more flexible than paraffin wax. The fine crystal structure also enables microcrystalline-wax to bind solvents or oil, and thus prevent the sweating-out of compositions. Also, the microcrystalline-wax contains a higher amorphous content compared to the paraffin wax.

Microcrystalline waxes are produced by de-oiling heavy distillates such as petrolatum during petroleum refining. This by-product is then de-oiled at a wax refinery. Depending on the end use and desired specification, the product then may have its odor removed and color removed.

Microcrystalline-waxes are tougher, more flexible and generally higher in melting point than paraffin wax. They are generally darker, more viscous, denser, tackier and more elastic than paraffin waxes, and have a higher molecular weight and melting point. The elastic and adhesive characteristics of microcrystalline waxes are related to their non-straight chain components.

Microcrystalline waxes when produced by wax refiners are typically produced to meet a number of ASTM specifications. These include congeal point (ASTM D938), needle penetration (D1321), color (ASTM D6045), and viscosity (ASTM D445). Microcrystalline waxes can generally be put into two categories: "laminating" grades and "hardening" grades. The laminating grades typically have a melt point of 140-175 F (60-80 C) and needle penetration of 25 or above. The hardening grades will range from about 175-200 F (80-93 C) and have a needle penetration of 25 or below. Color in both grades can range from brown to white, depending on the degree of processing done at the refinery level.

Microcrystalline-wax is often used in making of tire and rubber, candles, adhesives, corrugated board, cosmetics, and castings. Microcrystalline-waxes are excellent materials to use when modifying the crystalline properties of paraffin wax. The microcrystalline-wax has significantly more branching of the carbon chains that are the backbone of paraffin wax. This is useful when some desired functional changes in the paraffin are needed, such as flexibility, higher melt point, and increased opacity. They are also used as slip agents in printing ink.

TABLE 1

Comparison of Microcrystalline and Paraffin Waxes

| Paraffin-Wax | Microcrystalline-Wax |
| --- | --- |
| Mainly unbranched alkanes | Mainly branched alkanes |
| Crystalline | Amorphous |
| Brittle | Malleable |
| Translucent | Opaque |
| Low melting | Higher melting |
| (48 to 70° C.) | (54 to 95° C.) |

By "emulsion" or "microcrystalline-wax-based emulsion" is meant an aqueous colloidally occurring dispersion or mixture in a liquid or paste-like form comprising wax materials, which has both the discontinuous and the continuous phases, preferably as liquid. For example, an aqueous microcrystalline-wax system can either be a general colloid, or it can be an emulsion (which is a type of colloid), depending on the melt temperature of the emulsified microcrystalline-wax versus the use temperature. In the disclosure below, the term "emulsion" is used. It should be noted, however, that a colloidal dispersion is also within the scope of the present invention.

By "colloidally-protected microcrystalline-wax-based microstructure" (CMWB microstructure) is meant a colloidal dispersion or emulsion, wherein the microstructure is colloidally protected with a wax or a lower fraction hydrocarbon core. The microstructure can exist in a dispersion or emulsion form.

Colloidally-Protected Microcrystalline-Wax-Based Microstructures

This invention relates to DRA materials that comprise CMWB microstructures, preferably in an emulsion form. They have been alternatively called "CMWB microstructure based DRA emulsion," or "DRA emulsion," or "DRA emulsion comprising CMWB microstructure." CMWB microstructures have a microcrystalline-wax core and film or casing of polymeric moieties which are adhered to the core via secondary forces such as hydrogen bonding or Van Der Waals forces as opposed to a mechanical shell over a core in a classical core-shell structure. CMWB microstructures are described in detail below. In the aqueous emulsion of the DRA comprising the CMWB microstructures, the core may be fully or partially encapsulated, in that the colloidal shell is not a physical shell like that of a typical core-shell structure. The DRA emulsion comprising CMWB microstructure provides low-dust property and adhesion property to the joint compound to which it is added.

CMWB Microstructure Shell

The polymers selected for the shell of the CMWB microstructures for low-dust joint compound applications are one or more of the following:

Polyvinyl alcohol and copolymers, cellulose ethers, polyethylene oxide, polyethyleneimines, polyvinylpyrrolidone, and copolymers, polyethylene glycol, polyacrylamides and poly(Nisopropylamides, pullulan, sodium alginate, gelatin, and starches. Polyvinyl alcohol and copolymers are preferred.

CMWB Microstructure Core

The core of the colloidally-protected microcrystalline-wax-based microstructures can be a microcrystalline-wax as defined previously. This invention also envisions a blend of microcrystalline-wax and paraffin-wax, wherein the microcrystalline-wax is at least 50% by weight of the combined content of the microcrystalline-wax and the paraffin-wax. The content of microcrystalline-wax in such a blend can be any one of the following numbers or an inclusive range defined by any two numbers expressed in percentage:

30, 35, 40, 45, 50, 55, 60, 65, 70, 75, 80, 85, 90, 95, and 100.

Preferably the core comprises the microcrystalline-wax in a substantial amount, for example, greater than 90%.

The melting point of core waxes lower than the melting point of the colloidally-protective polymeric shell.

Some embodiments of the present invention envision microcrystalline-wax that comprises branched structures as well as a blend or mixture of linear and branched structures of the microcrystalline-wax. This invention also embodies mixtures or blends of waxes with two or more carbon numbers that may either be linear, branched, or blends of linear and branched structures. For example, a wax could be a mixture of $C_{15}$ linear and $C_{20}$ linear hydrocarbon alkane wax. In another example, the wax could be a mixture of C16 linear and C16 branched hydrocarbon alkane wax. In yet another example, the wax could be a mixture of C15 linear, C16 linear, and C20 branched. In yet another example, the wax could be a mixture of C18 linear, C18 branched.

Waxes usable as core in the CMWB microstructure-based DRA emulsion of the present invention are described.

Waxes

For the purposes of the present invention, waxes include naturally occurring waxes and synthetic waxes. Naturally occurring waxes include plant based waxes, animal waxes, and mineral waxes. Synthetic waxes are made by physical or chemical processes.

Examples of plant based waxes include mixtures of unesterified hydrocarbons, which may predominate over esters. The epicuticular waxes of plants are mixtures of substituted long-chain aliphatic hydrocarbons, containing alkanes, alkyl esters, sterol esters, fatty acids, primary and secondary alcohols, diols, ketones, aldehydes, aliphatic aldehydes, primary and secondary alcohols, β-diketones, triacylglycerols, and many more. The nature of the other lipid constituents can vary greatly with the source of the waxy material, but they include hydrocarbons. Specific examples of plant wax include Carnauba wax, which is a hard wax obtained from the Brazilian palm *Copernicia prunifera*, which contains the ester myricyl cerotate. Other plant based waxes include candelilla wax, ouricury wax, jojoba plant wax, bayberry wax, Japan wax, sunflower wax, tall oil, tallow wax, rice wax, and tallows.

Animal wax includes beeswax as well as waxes secreted by other insects. A major component of the beeswax used in constructing honeycombs is the ester myricyl palmitate which is an ester of triacontanol and palmitic acid. Spermaceti occurs in large amounts in the head oil of the sperm whale. One of its main constituents is cetyl palmitate, another ester of a fatty acid and a fatty alcohol. Lanolin is a wax obtained from wool, consisting of esters of sterols. Other animal wax examples include lanocerin, shellac, and ozokerite.

Examples of mineral waxes include montan wax, microcrystalline wax and paraffin wax. Although many natural waxes contain esters, paraffin waxes are hydrocarbons, mixtures of alkanes usually in a homologous series of chain lengths. Montan wax is a fossilized wax extracted from coal and lignite. It is very hard, reflecting the high concentration of saturated fatty acids/esters and alcohols. Montan wax includes chemical components formed of long chain alkyl acids and alkyl esters having chain lengths of about 24 to 30 carbons. In addition, natural montan includes resin acids, polyterpenes and some alcohol, ketone and other hydrocarbons such that it is not a "pure" wax. The saponification number of montan, which is a saponifiable wax, is about 92 and its melting point is about 80° C. Waxes comprising esters and/or acids may act as emulsifiers to the paraffins.

Synthetic waxes include waxes based on polypropylene, polyethylene, and polytetrafluoroethylene. Other synthetic waxes are based on fatty acid amines, Fischer-Tropsch, and polyamides, polyethylene and related derivatives. Some waxes are obtained by cracking polyethylene at 400° C. The products have the formula $(CH_2)_nH_2$, where n ranges between about 50 and 100.

Also, outside of the building products context, in addition to waxes that occur in natural form, there are various known synthetic waxes which include synthetic polyethylene wax of low molecular weight, i.e., molecular weights of less than about 10,000, and polyethylenes that have wax-like properties. Such waxes can be formed by direct polymerization of ethylene under conditions suitable to control molecular weight. Polyethylenes with molecular weights in about the 2,000-4,000 range are waxes, and when in the range of about 4,000-12,000 become wax resins.

Fischer-Tropsch waxes are polymethylene waxes produced by a particular polymerization synthesis, specifically, a Fischer-Tropsch synthesis (polymerization of carbon monoxide under high pressure, high temperature and special catalysts to produce hydrocarbon, followed by distillation to separate the products into liquid fuels and waxes). Such waxes (hydrocarbon waxes of microcrystalline, polyethylene and polymethylene types) can be chemically modified by, e.g., air oxidation (to give an acid number of 30 or less and a saponification number no lower than 25) or modified with maleic anhydride or carboxylic acid. Such modified waxes are more easily emulsified in water and can be saponified or esterified. Other known synthetic waxes are polymerized alpha-olefins. These are waxes formed of higher alpha-olefins of 20 or more carbon atoms that have wax like properties. The materials are very branched with broad molecular weight distributions and melting points ranging about 54° C. to 75° C. with molecular weights of about 2,600 to 2,800. Thus, waxes differ depending on the nature of the base material as well as the polymerization or synthesis process, and resulting chemical structure, including the use and type of any chemical modification.

In one embodiment of the invention, the wax used for the preparation of the dispersion or emulsion is used in a micronized, pulverized form. U.S. Pat. Nos. 8,669,401 and 4,846,887 show exemplary micronization processes. Both these patents are incorporated by reference herein as if fully set forth.

In one embodiment, the emulsifiers for this invention include montan wax, esters/acids, styrene-maleic anhydride, polyolefin maleic anhydride, or other anhydrides, carnauba wax, rice wax, sunflower wax.

Theory for Colloidally-Protected Microcrystalline-Wax-Based Microstructures

Generally speaking, two scientific theories have been proposed to explain the stability of CMWB microstructures that comprise the DRA emulsion materials of the present invention, namely, steric hindrance and electrostatic repulsion. Applicants do not wish to be bound by these theories, however. Applicants believe their invention relates to microcrystalline-wax-based dispersions that may or may not relate to the two theories. It is possible that one or both theories or neither of the two may explain the CMWB microstructures of the present invention.

As described in FIG. 1, in the first step, a colloidally-protected microcrystalline-wax based microstructure in an emulsion is prepared. The emulsion is prepared according to the specification for their use in variety of applications. For a general understanding of the method of making the exemplary wax emulsion, reference is made to the flow diagram in FIG. 1. As shown in 101, first the microcrystalline-wax components may be mixed in an appropriate mixer device. Then, as shown in 102, the wax component mixture may be pumped to a colloid mill or homogenizer. As demonstrated in 103, in a separate step, water, and any emulsifiers, stabilizers, or additives (e.g., ethylene-vinyl alcohol-vinyl acetate terpolymer) are mixed. Then the aqueous solution is pumped into a colloid mill or homogenizer in 104. Steps 101 and 103 may be performed simultaneously, or they may be performed at different times. Steps 102 and 104 may be performed at the same time, so as to ensure proper formation of droplets in the emulsion. In some embodiments, steps 101 and 102 may be performed before step 103 is started. Finally, as shown in 105, the two mixtures from 102 and 104 are milled or homogenized to form an aqueous wax-based emulsion.

Figure 2:
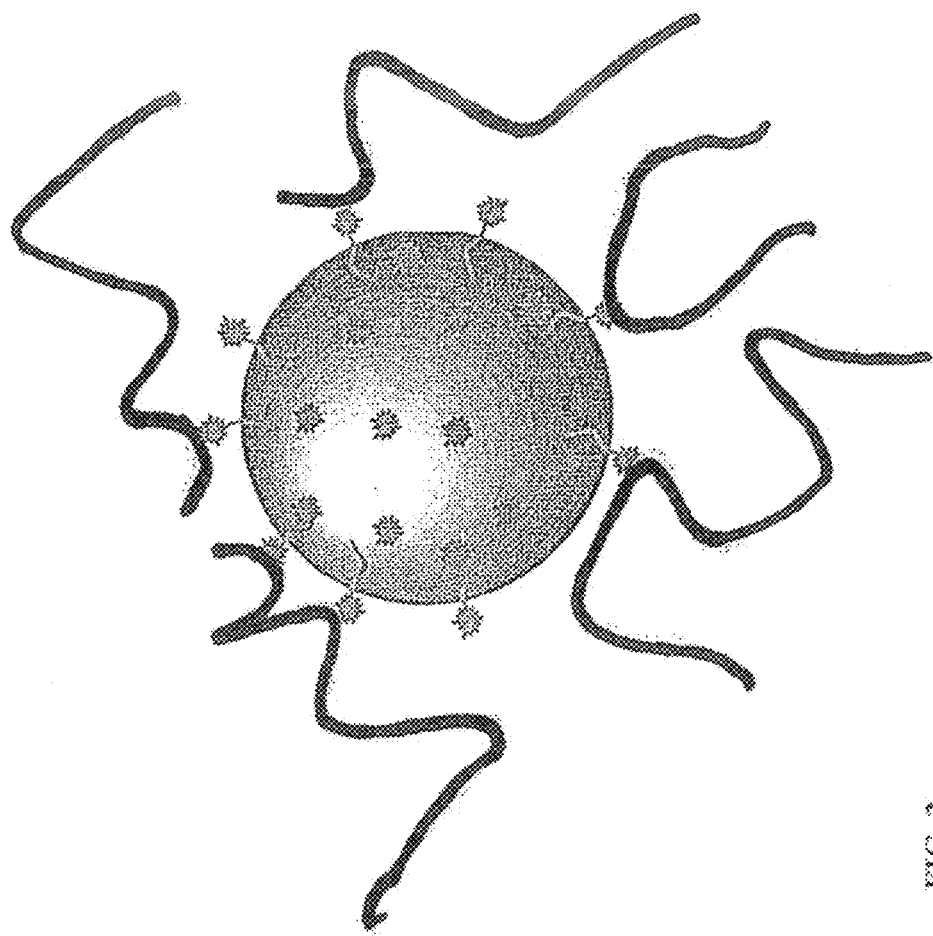
FIG. 2 describes the particle model of a unitary microcrystalline-wax particle that has been stabilized in the colloidal dispersion.
Figure 2:
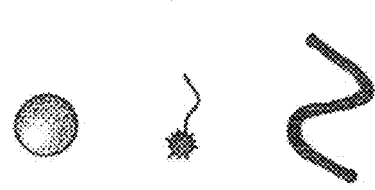

FIG. 2 describes the particle model of a unitary microcrystalline-wax particle that has been stabilized in the colloidal dispersion. Applicants do not wish to be bound by the theory of the unitary microcrystalline-wax particle stabilized in the dispersion. According to this model, the hydrophobic hydrocarbon "tail" of the montan is embedded in the microcrystalline-wax particle. The "head" of montan, which is hydrophilic is then tethered to polyvinyl alcohol. The first mechanism by which many of the wax emulsions (colloidal dispersions) are stabilized is the steric hindrance mechanism. According to this mechanism, high molecular weight polymers (e.g. PVOH) are tethered to the outer surface of a microcrystalline-wax particle and surround it. Due to steric hindrance, the PVOH molecules surrounding each wax particle then prevent adjacent microcrystalline-wax particles from coalescing.

Alternatively, electrostatic repulsion helps with the stabilization of the colloidal dispersions. In this mechanism, the montan wax particle, which contains acid or ester groups (either inherently or mixed in), is first saponified with a base, converting the acid or ester groups to negatively charged carboxylate moieties. Because of their polar nature, these negatively charged carboxylate moieties exist at the water/wax interface, giving the surrounded microcrystalline wax particle a net negative charge. These negative charges on adjacent wax particles then constitute a repulsive force between particles that effectively stabilizes the dispersion (emulsion).

Thus, according to one model, as shown in FIG. 2, a microcrystalline-wax particle is enclosed in a "web" of PVOH polymeric chains. This is not akin to a shell of a typical core-shell particle, but the PVOH loosely protects (colloidally protects) the microcrystalline-wax particle. One could envision the microcrystalline-wax particle as a solid ball or a nucleus surrounded by polymeric chains like strings.

Figure 3:
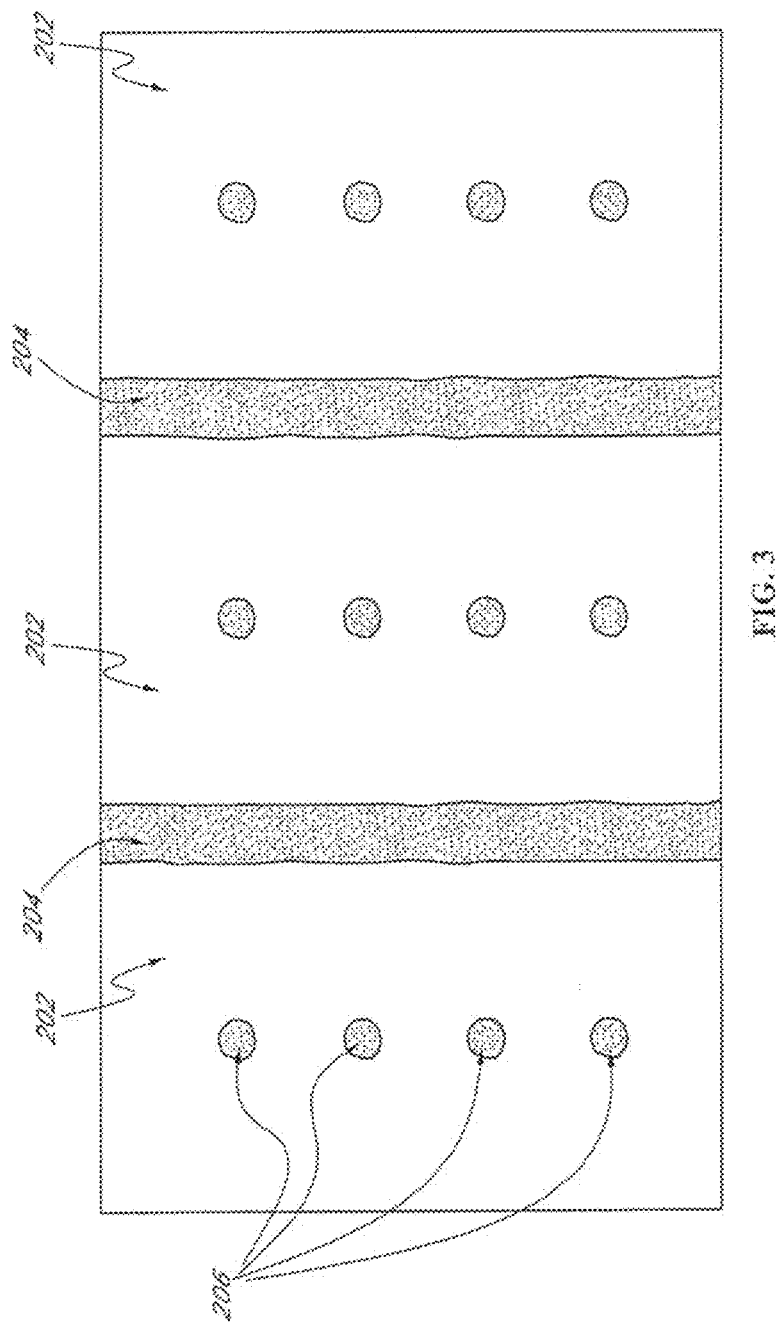
FIG. 3 illustrates a wall having an example embodiment of the disclosed joint compound applied thereon.
Figure 4:
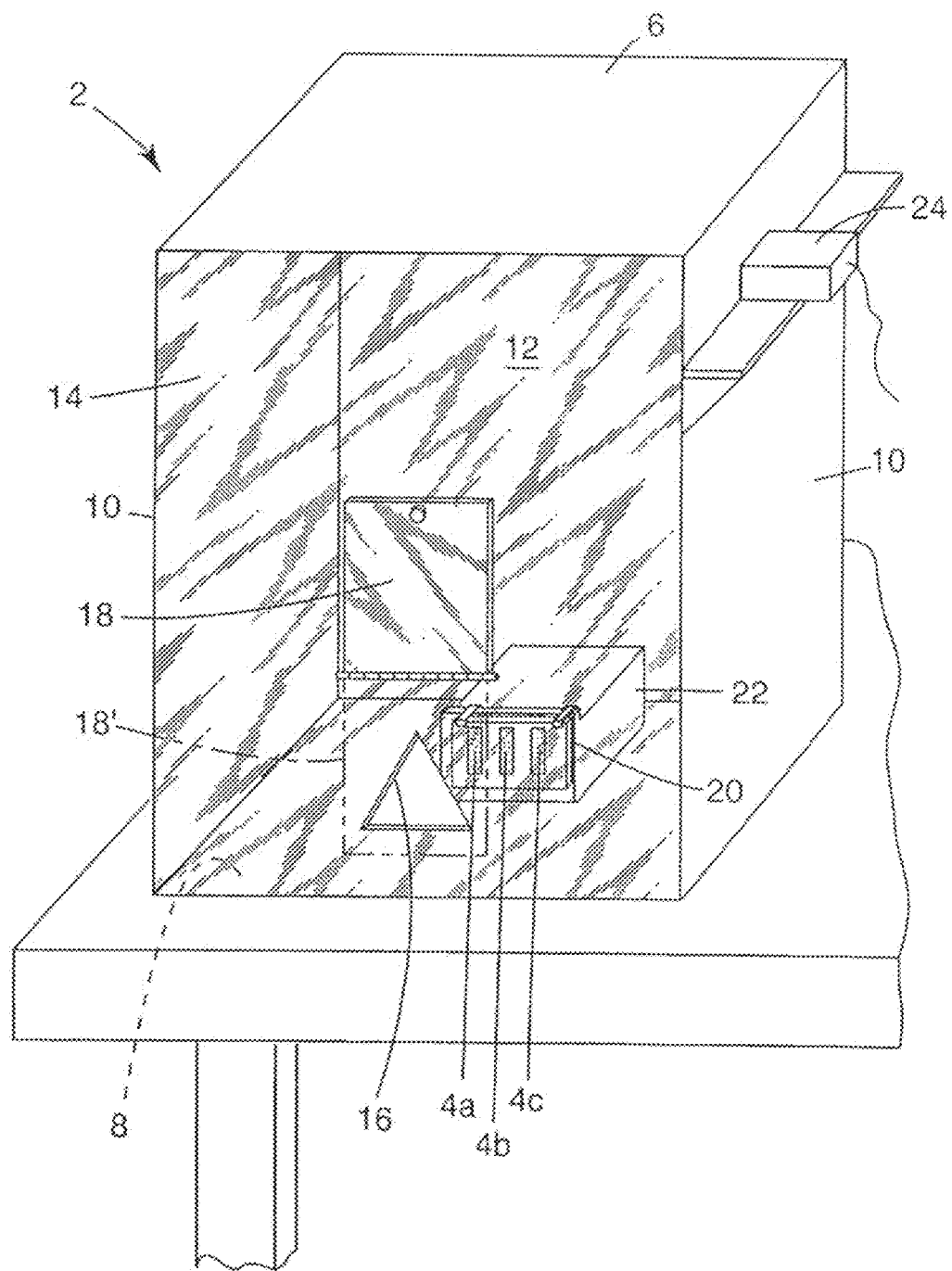
FIG. 4 shows the test enclosure used to sand test specimens and measure the quantity of airborne dust particles generated.

In another embodiment, and as shown in FIGS. 3 and 4, the polymer, for example PVOH, forms a shell like physical film or casing such as a film (PVOH is an excellent film former), the casing herein is based on secondary forces of attraction, e.g., Van der Waals forces. Hydrogen bonding may also be one of the forces for the encapsulation of the PVOH of the wax particles. Applicants do not wish to be bound by this theory. However, the model does explain the wax particle with the PVOH casing over it. In the above examples, PVOH is used as an exemplary polymeric system. However, other polymeric systems used herein, or their combinations can also be used to prepare the colloidally-protected microcrystalline-wax-based microstructures.

Dust Reduction Additive Emulsion

Exemplary emulsion comprising CMWB microstructure for use in, for example, as a dust reduction additive (and for water-resistance) in a joint compound are now described in greater detail, as follows.

In one embodiment, the microcrystalline-wax emulsion may comprise water, a base, one or more waxes optionally selected from the group consisting of slack wax, montan wax, and microcrystalline-wax, and a polymeric stabilizer, such as ethylene-vinyl alcohol-vinyl acetate terpolymer or polyvinyl alcohol. Further, carnauba wax, sunflower wax, tall oil, tallow wax, rice wax, and any other natural or synthetic wax or emulsifier containing organic acids and/or esters can be used to form the wax emulsion.

Water may be provided to the emulsion, for example in amounts of about 30% to about 60% by weight of the emulsion. The solids content of the wax emulsion is preferably about 40% to about 70% by weight of the emulsion. Other amounts may be used.

In some embodiments, a dispersant and/or a surfactant may be employed in the wax emulsions. Optional dispersants, include, but are not limited to those having a sulfur or a sulfur-containing group(s) in the compound such as sulfonic acids (R—S(=O)2-OH) and their salts, wherein the R groups may be otherwise functionalized with hydroxyl, carboxyl or other useful bonding groups. In some embodiments, higher molecular weight sulfonic acid compounds such as lignosulfonate, lignosulfonic acid, naphthalene sulfonic acid, the sulfonate salts of these acids, and derivatized or functionalized versions of these materials are used in addition or instead. An example lignosulfonic acid salt is Polyfon® H available from MeadWestvaco Corporation, Charleston, S.C. Other dispersants may be used, such as magnesium sulfate, polycarboxylate technology, ammonium hepta molybdate/starch combinations, non-ionic surfactants, ionic surfactants, zwitterionic surfactants and mixtures thereof, alkyl quaternary ammonium montmorillonite clay, etc. Similar materials may also be used, where such materials may be compatible with and perform well with the formulation components.

In one embodiment, a dispersant and/or surfactant may comprise about 0.01% to about 5.0% by weight of the wax emulsion formulation composition, preferably about 0.1% to about 2.0% by weight of the wax emulsion formulation composition. Other concentrations may be used.

The wax component of the emulsion may include at least one wax which may be slack wax, or a combination of montan wax and slack wax. The total wax content may be about 30% to about 60%, more preferably about 30% to about 40% by weight of the emulsion. Slack wax may be any suitable slack wax known or to be developed which incorporates a material that is a higher petroleum refining fraction of generally up to about 20% by weight oil. In addition to, or as an alternative to slack wax, microcrystalline-waxes of a more refined fraction are also useful within the scope of the invention.

Suitable microcrystalline-waxes may be any suitable wax, and preferably waxes with melting points of from about 40° C. to about 110° C., although lower or higher melting points may be used if drying conditions are altered accordingly using any techniques known or yet to be developed in the composite board manufacturing arts or otherwise. Thus, microcrystalline-waxes or less refined slack wax may be used. Optionally, synthetic waxes such as ethylenic polymers or hydrocarbon types derived via Fischer-Tropsch synthesis may be included in addition. The wax emulsion used in the joint compound can be formed from slack wax, montan wax, microcrystalline-wax, carnauba wax, tall oil, sunflower wax, rice wax, and any other natural or synthetic wax containing organic acids and/or esters, or combinations thereof. For example, synthetic wax used in the joint compound may comprise ethylenic polymers or hydrocarbon types, optionally derived via Fischer-Tropsch synthesis, or combinations thereof. Optionally, the synthetic waxes can be added in concentrations ranging from about 0.1% to about 8% of the dry weight of the joint compound or from about 0.5% to about 4.0% of the dry weight of the joint compound. In some embodiments, the wax emulsion is stabilized by polyvinyl alcohol.

Montan wax, which is also known in the art as lignite wax, is a hard, naturally occurring wax that is typically dark to amber in color (although lighter, more refined montan waxes are also commercially available). Montan is insoluble in water, but is soluble in solvents such as carbon tetrachloride, benzene and chloroform. In addition to naturally derived montan wax, alkyl acids and/or alkyl esters which are derived from high molecular weight fatty acids of synthetic or natural sources with chain lengths preferably of over 18 carbons, more preferably from 26 to 46 carbons that function in a manner similar to naturally derived montan wax are also within the scope of the invention and are included within the scope of "montan wax" as that term is used herein unless the context indicates otherwise (e.g., "naturally occurring montan wax"). Such alkyl acids are generally described as being of formula R—COOH, where R is an alkyl nonpolar group which is lipophilic and can be from 18 to more than 200 carbons. An example of such a material is octacosanoic acid and its corresponding ester which is, for example, a di-ester of that acid with ethylene glycol. The COOH group forms hydrophilic polar salts in the presence of alkali metals such as sodium or potassium in the emulsion. While the alkyl portion of the molecule gets embedded within the microcrystalline-wax, the acid portion is at the microcrystalline-wax/aqueous medium interface, providing stability to the emulsion.

In some embodiments, the at least one wax component is made up of a combination of microcrystalline-wax and montan wax or of slack wax and montan wax. Although it should be understood that varying combinations of such waxes can be used. When using montan wax in combination with one or more of the other suitable wax components, it is preferred that montan be present in an amount of about 0.1% to about 10%, more preferably about 1% to about 4% by weight of the wax emulsion with the remaining wax or waxes present in amounts of from about 30% to about 50%, more preferably about 30% to about 35% by weight of the wax emulsion.

In some embodiments, the wax emulsion includes polyvinyl alcohol (PVOH) of any suitable grade which is at least partially hydrolyzed. The preferred polyvinyl alcohol is at least 50%, and more preferably at least 90%, and most preferably about 97-100% hydrolyzed polyvinyl acetate. The PVA can be hydrolyzed to the extent defined by the percentage numbers below:

50, 55, 60, 65, 70, 75, 80, 85, 90, 95, and 100.

The PVA can also be hydrolyzed up to the extent of a number that resides in the range defined by any two numbers above, including the endpoints.

Suitably, the polyvinyl alcohol is soluble in water at elevated temperatures of about 60° C. to about 95° C., but insoluble in cold water. The hydrolyzed polyvinyl alcohol is preferably included in the emulsion in an amount of up to about 5% by weight, preferably 0.1% to about 5% by weight of the emulsion, and most preferably about 2% to about 3% by weight of the wax emulsion.

In some embodiments, the stabilizer comprises a polymer that is capable of hydrogen bonding to the carboxylate or similar moieties at the water/microcrystalline-wax interface. Polymers that fit the hydrogen-bonding requirement would have such groups as hydroxyl, amine, and/or thiol, amongst others, along the polymer chain. Reducing the polymer's affinity for water (and thus, its water solubility) could be achieved by inserting hydrophobic groups such as alkyl, alkoxy silanes, or alkyl halide groups into the polymer chain. The result may be a polymer such as ethylene-vinyl acetate-vinyl alcohol terpolymer (where the vinyl acetate has been substantially hydrolyzed). The vinyl acetate content may be between 0% to 15%. In some embodiments, the vinyl acetate content is between 0% and 3% of the terpolymer chain. The ethylene-vinyl alcohol-vinyl acetate terpolymer may be included in the emulsion in an amount of up to about 10.0% by weight, preferably 0.1% to about 5.0% by weight of the emulsion. In some embodiments, ethylene-vinyl alcohol-vinyl acetate terpolymer may be included in the emulsion in an amount of about 2% to about 3% by weight of the wax emulsion. An example ethylenevinyl alcohol-vinyl acetate terpolymer that is available is the Exceval AQ4104™, available from Kuraray Chemical Company.

The dust reduction additive wax emulsion may include a stabilizer material (e.g., PVOH, ethylene-vinyl alcohol-vinyl acetate terpolymer as described above). The stabilizer may be soluble in water at elevated temperatures similar to those disclosed with reference to PVOH (e.g., about 60° C. up to about 95° C.), but insoluble in cold water. The active species in the wax component (e.g., montan wax) may be the carboxylic acids and esters, which may comprise as much as 90% of the wax. These chemical groups may be converted into carboxylate moieties upon hydrolysis in a high pH environment (e.g., in an environment including aqueous KOH). The carboxylate moieties may act as a hydrophilic portion or "head" of the molecule. The hydrophilic portions can directly interface with the surrounding aqueous environment, while the rest of the molecule, which may be a lipophilic portion or "tail", may be embedded in the hydrocarbon wax.

A stabilizer capable of hydrogen bonding to carboxylate moieties (e.g., PVOH or ethylene-vinyl alcohol-vinyl acetate terpolymer as described above) may be used in the wax emulsion. The polar nature of the carboxylate moiety may offer an optimal anchoring point for a stabilizer chain through hydrogen bonding. When stabilizer chains are firmly anchored to the carboxylate moieties as described above, the stabilizer may provide emulsion stabilization through steric hindrance. In embodiments where the wax emulsion is subsequently dispersed in a wallboard (e.g., gypsum board) system, all the water may be evaporated away during wallboard manufacture. The stabilizer may then function as a gate-keeper for repelling moisture. Decreasing the solubility of the stabilizer in water may improve the moisture resistance of the wax emulsion and the wallboard. For example, fully hydrolyzed PVOH may only dissolve in heated, and not cool, water. For another example, ethylene-vinyl alcohol-vinyl acetate terpolymer may be even less water soluble than PVOH. The ethylene repeating units may reduce the overall water solubility. Other stabilizer materials are also possible. For example, polymers with hydrogen bonding capability such as those containing specific functional groups, such as alcohols, amines, and thiols, may also be used. For another example, vinyl alcohol-vinyl acetate-silyl ether terpolymer can be used. An example vinyl alcohol-vinyl acetate-silyl ether terpolymer is Exceval R2015, available from Kuraray Chemical Company. In some embodiments, combinations of stabilizers are used.

In some embodiments, the wax emulsion comprises a base. For example, the wax emulsion may comprise an alkali metal hydroxide, such as potassium hydroxide or other suitable metallic hydroxide, such as aluminum, barium, calcium, lithium, magnesium, sodium and/or zinc hydroxide. These materials may serve as saponifying agents. Non-metallic bases such as derivatives of ammonia as well as amines (e.g., diethanolamine or triethanolamine) can also be used. Combinations of the above-mentioned materials are also possible. If included in the wax emulsion, potassium hydroxide is preferably present in an amount of 0% to 1%, more preferably about 0.1% to about 0.5% by weight of the wax emulsion.

In some embodiments, an exemplary wax emulsion comprises: about 30% to about 60% by weight of water; about 0.1% to about 5% by weight of a lignosulfonic acid or a salt thereof; about 0% to about 1% by weight of potassium hydroxide; about 30% to about 50% by weight of wax selected from the group consisting of microcrystalline-wax, slack wax and combinations thereof; and about 0.1% to about 10% montan wax, and about 0.1 to 5% by weight of ethylene-vinyl alcohol-vinyl acetate terpolymer.

The wax emulsion may further include other additives, including without limitation additional emulsifiers and stabilizers typically used in wax emulsions, flame retardants, lig-nocellulosic preserving agents, fungicides, insecticides, biocides, waxes???, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the wax emulsion.

Shown in the below tables are exemplary embodiments of a wax emulsion, although other quantities in weight percent may be used.

TABLE 2

First Exemplary Embodiment of Dust Reduction Additive Emulsion

| Raw Material | Quantity in Weight Percent |
| --- | --- |
| Water | 58 |
| Polyvinyl alcohol | 2.70 |
| Dispersant (Optional) | 1.50 |
| Microcrystalline Wax | 34.30 |
| Montan Wax | 3.50 |
| Biocide | 0.02 |

TABLE 3

Second Exemplary Embodiment of Dust Reduction Additive Emulsion

| Raw Material | Quantity in Weight Percent |
| --- | --- |
| Water | 58.80 |
| Polyvinyl alcohol | 2.80 |
| Diethanol Amine | 0.04 |
| Microcrystalline Wax | 34.80 |
| Montan Wax | 3.50 |
| Biocide | 0.10 |

The microcrystalline-wax emulsion may be prepared using any acceptable techniques known in the art or to be developed for formulating wax emulsions, for example, the wax(es) are preferably heated to a molten state and blended together (if blending is required). A hot aqueous solution is prepared which includes any additives such as emulsifiers, stabilizers, etc., ethylene-vinyl alcohol-vinyl acetate terpolymer (if present), potassium hydroxide (if present) and lignosulfonic acid or any salt thereof. The emulsifiers may also optionally be mixed with the wax blend. The wax is then metered together with the aqueous solution in appropriate proportions through a colloid mill or similar apparatus to form a wax emulsion, which may then be cooled to ambient conditions if desired.

In some embodiments, the wax emulsion may be incorporated with or coated on various surfaces and substrates. For example, the wax emulsion may be mixed with gypsum to form a gypsum wallboard having improved moisture resistance properties.

Some or all steps of the above method may be performed in open vessels. However, the homogenizer may use pressure in its application.

Advantageously in some embodiments, the emulsion, once formed, is cooled quickly. By cooling the emulsion quickly, agglomeration and coalescence of the wax particles may be avoided.

In some embodiments the wax mixture and the aqueous solution are combined in a pre-mix tank before they are pumped into the colloid mill or homogenizer. In other embodiments, the wax mixture and the aqueous solution may be combined for the first time in the colloid mill or homogenizer. When the wax mixture and the aqueous solution are combined in the colloid mill or homogenizer without first being combined in a pre-mix tank, the two mixtures may advantageously be combined under equivalent or nearly equivalent pressure or flow rate to ensure sufficient mixing.

In some embodiments, once melted, the wax emulsion is quickly combined with the aqueous solution. While not wishing to be bound by any theory, this expedited combination may beneficially prevent oxidation of the wax mixture.

In some embodiments, once melted, the wax emulsion is quickly combined with the aqueous solution. While not wishing to be bound by any theory, this expedited combination may beneficially prevent oxidation of the wax mixture.

Low-Dust Joint Compound

Embodiments of the disclosed CMWB microstructure based dust reducing additive emulsion can be used to form a low-dust joint compound. The joint compound can be used to cover, smooth, or finish gaps in boards, such as joints between adjacent boards, screw holes, and nail holes. The joint compound can also be used for repairing surface defects on walls and applying texture to walls and ceilings amongst numerous other applications. The joint compound comprises a filler material. Any conventional filler material can be used in the present invention. Suitable fillers include calcium carbonate ($CaCO_3$) and calcium sulfate dihydrate ($CaSO_4 2H_2O$ commonly referred to as gypsum) for ready mixed type joint compounds, and calcium sulfate hemihydrate ($CaSO_4$-½ $H_2O$) for setting type joint compounds. The joint compound can also include one or more secondary fillers such as glass micro bubbles, mica, perlite, talc, limestone, pyrophyllite, silica, and diatomaceous earth. The filler generally comprises from about 25% to about 95% of the weight of the joint compound based on the total wet weight of the formulation (i.e. including water). More preferably, the filler comprises from about 55% to about 75% of the total wet weight, and most preferably, from about 60% to about 70%.

Another ingredient usually present in joint compounds is a binder or resin. Suitable binders include polyvinyl acetate, polyvinyl alcohol, ethylene vinyl acetate co-polymer, vinylacrylic co-polymer, styrenebutadiene, polyacrylamide, other acrylic polymers, other latex emulsions, natural and synthetic starch, and casein. These binders can be used alone or in combination with one another. The amount of binder can range from about 1% to about 45% of the joint compound total wet weight. More preferably, the binder comprises from about 1% to about 20% of the total wet weight, and most preferably, from about 4% to about 14%.

A surfactant can also be included in the joint compound formulation. The surfactant generally comprises less than about 3.5% of the joint compound total wet weight, and preferably less than about 0.25%.

Many joint compound formulations also contain a cellulosic thickener, usually a cellulosic ether. Suitable thickeners include methyl cellulose, hydroxypropyl cellulose, hydroxypropyl methyl cellulose, hydroxyethyl cellulose, hydroxyethyl methyl cellulose, hydroxyethyl hydroxypropyl cellulose, ethyl hydroxyethyl cellulose, and sodium carboxymethyl cellulose (CMC). These thickeners can be used alone or in combination with one another. The amount of cellulosic thickener can range from about 0.1% to about 2% by weight of the joint compound. A preferred thickener is hydroxypropyl methyl cellulose available from Dow Chemical Company under the trade designation Methocel®.

Another ingredient that can be included in the joint compound of the invention is a non-leveling agent. Suitable non-leveling agents include clays such as attapulgus clay, bentonite, illite, kaolin and sepiolite, and clays mixed with starches. Thickeners, such as those described above, can also function as non-leveling agents.

To provide a lighter weight joint compound, glass bubbles or a specially treated expanded perlite can be added as described in U.S. Pat. No. 4,454,267. Additional ingredients which can be utilized in the joint compound are preservatives, fungicides, anti-freeze wetting agents, defoamers, flocculants, such as polyacrylamide resin, and plasticizers, such as dipropylene glycol dibenzoate.

The wax emulsion used in the joint compound can be formed from slack wax, montan wax, microcrystalline wax, carnauba wax, tall oil, sunflower wax, rice wax, and any other natural or synthetic wax containing organic acids and/or esters, or combinations thereof. For example, synthetic wax used in the joint compound may comprise ethylenic polymers or hydrocarbon types, optionally derived via Fischer-Tropsch synthesis, or combinations thereof. By way of further example, synthetic wax used in the joint compound may comprise polyethylene glycol, methoxypolyethylene glycol, or combinations thereof. Optionally, the synthetic waxes can be added in concentrations ranging from about 0.1% to about 8% of the dry weight of the joint compound or from about 0.5% to about 4.0% of the dry weight of the joint compound. In some embodiments, the wax emulsion is stabilized by polyvinyl alcohol.

In some embodiments, perlite can be used in a joint compound to, for example, control the density, shrinkage, and crack resistance of the joint compound. In some embodiments, perlite need not be used (e.g., where weight is not as much of a factor).

In some embodiments, mica can be used in a compound as well. Mica, which is a low bulk density mineral, may be used as a filler or extender, and may also improve crack resistance of the joint compound.

In some embodiments of the joint compound gypsum (calcium sulfate dihydrate) can also be used. Gypsum can be used to replace calcium carbonate, or can be used in conjunction with calcium carbonate. In some embodiments, talc can be included in a joint compound to, for example, enhance application properties and can also be used as a white extender pigment.

In some embodiments, clay can be used in a joint compound as, for example, a non-leveling agent and/or a thickening agent that can control the viscosity or rheology of the final product. Clay can also help enhance or create the water-holding properties of the joint compound.

In some embodiments, thickeners can be used to control the viscosity, affect the rheology, and affect the water holding characteristics of a joint compound. For example, cellulose ether can be used as a thickener.

In some embodiments, binders can be used in a joint compound to, for example, improve bonding to the substrate such as wallboard.

In some embodiments, a glycol can be used in a joint compound to provide functional properties to the joint compound such as wet edge, open time, controlling drying time, and freeze/thaw stability.

In some embodiments, other rheology modifiers can also be used in conjunction with, or instead of, some of the above described compositions.

In some embodiments, fillers can be used in the joint compound. For example, calcium carbonate, calcium sulfate hemihydrate, or calcium sulfate dehydrate can all be used as fillers, though other materials can be used as well. Further, thickeners, preservatives, binders, and other additives can be incorporated into the joint compound.

Other additives can also be added to the described joint compound in addition to the wax emulsion. In some embodiments, metal siliconate salts such as, for example, potassium siliconate, as well as silicone based compounds such as, for example, poly hydrogen methyl siloxane and polydimethyl siloxane, could provide advantageous water resistance to a joint compound. In some embodiments, fluorinated compounds and stearate-based salts could also be used to provide advantageous water resistance.

Wax emulsions can be particularly advantageous for use in a joint compound as compared to, for example, non-emulsified and/or non-stabilized waxes such as melted PEG M750. These non-emulsified waxes can impart severe deleterious effects on the adhesion properties of a joint compound. Therefore, if the non-emulsified wax is to be used at all, it must be added in very low levels. On the other hand, wax emulsions, such as those described herein, can advantageously increase the adhesion properties of a joint compound, at least due to the adhesive effects of the stabilizer, and thus can be added at higher dosage levels. The wax emulsions can then be useful as they can provide both low dust properties as well as water repellency to the joint compound. The wax emulsion can soften or melt when friction is applied, such as during cutting or sanding. Accordingly, dust can be agglomerated by the softened wax emulsion, where it can be securely held.

Embodiments of the joint compound can be applied in thin layers to a surface. The joint compound can be applied by, for example, using a trowel or other straight edged tool. However, the application and thickness of the layers of joint compounds is not limiting. Further, multiple layers may be applied in order to obtain a smooth, attractive finished wall. The number or layers applied is not limiting. In some embodiments, each layer can be allowed to dry prior to application of the next layer. In some embodiments, a second layer can be applied when the first layer is only partially dried. In some embodiments, the joint compound can be spread over mesh or tape used to connect wallboards.

In some embodiments, the joint compound may also be used to patch and texture interior walls. In some embodiments, the joint compound can be made of water, preservative, calcium carbonate, mica, clay, thickener, binder (e.g., latex binder), and a wax emulsion. In addition to a latex binder, other water soluble binders, such as polyvinyl alcohol, can be used as well. Other materials, such as talc, binders, fillers, thickening agents, preservatives, limestone, perlite, urea, defoaming agents, gypsum latex, glycol, and humectants can be incorporated into the joint compound as well or can substitute for certain ingredients (e.g., talc can be used in place of, or in addition to mica; gypsum can be used in place of, or in addition to calcium carbonate, etc.). In some embodiments, the calcium carbonate can be replaced either wholly or partially with a surface micro-roughened filler that can further enhance the joint compound's hydrophobicity. In some embodiments, Calcimatt™, manufactured by Omya AG, can be used. In some embodiments, cristobalite (silicon dioxide) such as Sibelite® M3000, manufactured by Quarzwerke, can be used. These fillers can be used alone or in combination. In some embodiments, the joint compound can be mixed in water. This mixture can then be applied to a surface, e.g., hole or joint, and can be allowed to dry. Once the water evaporates from the mixture, a dry, relatively hard cementitious material can remain. In some embodiments, shrinkage may occur upon drying.

FIG. 3 shows an example of a wall system incorporating an embodiment of a low-dust joint compound. As shown, the wall system can be made of a plurality of boards 202. There is no limit to the amount of boards or the positioning of boards next to one another. Where two boards 202 are adjacent to one another, a gap, or joint, can be formed. While the boards 202 themselves may be water-resistant, the joints may allow for moisture to pass through. Therefore, embodiments of the low-dust and water-resistant joint compound 204 can be spread across the joints. The compound 204 can be spread on the joint to completely cover the joint. In some embodiments, the boards 202 can also contain holes. These holes can be formed by nailing the boards 202 into studs, or other attachment means. Regardless of the reason for the hole, the compound 206 can also be used to cover the holes. The compound 206 can insert partial through the holes, or can cover the top of the holes, or both. The compound 206 can cover any fastener, e.g. a screw or nail that is located in the hole. In some embodiments, compound 206 and 204 are the same compound. The application and thickness of the compound 204/206 on the boards 202 is not limiting, and common methods of application can be used.

An example formula range of an embodiment of a low-dust water-resistant joint compound using the above disclosed wax is shown in the below Table 4:

TABLE 4

Exemplary Composition of a Low-Dust Joint Compound

| Component | Range |
| --- | --- |
| Water | 20-55% |
| Preservatives | 0.02-1.0% |
| Calcium Carbonate | 10-50% |
| Mica | 0.5-10% |
| Attapulgite Clay | 0.2-10% |
| Talc | 0.0-10% |
| Perlite | 0.0-40% |
| Polyethylene oxide | 0.0-10% |
| Polyether siloxane | 0.0-10% |
| Microcrystalline-wax emulsion | 0.1-20% |
| Latex binder | 0.5-10% |
| Cellulose ether thickener | 0.1-8.0% |

Further, an example of a specific formulation for a low-dust/water-resistant joint compound can is shown in the below Table 5, although other weight percentages may be used:

TABLE 5

Example Composition of a Low-Dust Joint Compound

| Compound | Wt. % |
| --- | --- |
| Preservative | 0.01 |
| Wetting Agent | 0.05 |
| Latex Binder | 5.89 |
| Water | 34.60 |
| Microcrystalline-wax emulsion | 7.36 |
| Cellulose ether | 0.55 |
| Attapulgite clay | 1.84 |
| Mica | 7.36 |
| Calcium Carbonate | 33.86 |
| Expanded Perlite | 8.47 |

Another embodiment of a low-dust/water-resistant ready-mix joint compound formula is shown in the below Table 5. In this embodiment, an optional potassium siliconate additive is incorporated.

TABLE 6

Embodiment of Low-Dust Joint Compound Composition

| Raw Material | Wt. % |
| --- | --- |
| Preservative | 0.20% |
| Latex (CPS 716) | 6.50% |
| Water | 36.70% |
| Microcrystalline-Wax Emulsion | 3.80% |
| Potassium Siliconate (Silres BS 16) | 0.20% |
| Cellulose Ether | 0.60% |
| Clay (Attagel 30) | 1.90% |
| Mica | 6.10% |
| Limestone (MW 100) | 35.20% |
| SilCel 43-34 | 8.80% |

Low-Dust Joint Compounds-Comparative Examples

To assess the reduction of dust formation during the sanding process by samples created with joint compound compositions of the present invention, the samples were compared with three other commercially available products. Testing was performed on all products upon thorough mixing. The commercially available products compared herein were:
(1) LaFarge North America, Inc.'s ("LaFarge") from United States Gypsum Company's ("USG");
(2) Sheetrock Lightweight All Purpose Plus 3 with Dust Control from USG; and
(3) ProForm DustTech from National Gypsum Company ("NSG").

Test Procedure

A test chamber was constructed as described at Col. 6, Lines 26-56 in U.S. Pat. No. 6,358,309, which is incorporated by reference herein. A power sander made by Makita Corporation, model B04556 was used to sand the specimens. The peak or highest level of dust particles measured for each sample was recorded. (See U.S. Pat. App. Pub. No. 20110065839).

The test procedure for measuring the quantity of airborne particles generated when sanding the hardened joint compound was as follows. First, each test specimen was prepared according to a specific formulation. The test specimens were approximately five inches long, one and one-half inches wide, and one quarter of an inch thick (5"×1½"×¼"). Before sanding, each test specimen was allowed to completely harden for at least twenty four hours at room temperature in an environment where the relative humidity generally ranged from about 25% to about 75%.

Referring to FIG. 4, there is shown the test enclosure 2 that was used to sand the three test specimens and measure the quantity of airborne dust particles generated. The enclosure 2 was a rectangular box six feet high, four feet wide, and two feet wide (6'×4'=2"). The top 6, bottom 8, side 10, and rear walls 12 of the enclosure 2 were constructed of wood, and the front wall 14 was constructed of transparent Plexiglas. A generally triangular access opening 16 located about one foot above the bottom wall 8 was provided in the front wall 14 to allow the individual conducting the test to insert her hand and arm into the enclosure and sand the specimen. The access opening 16 had a base dimension of about 7½ inches and a height of about 8½ inches. A movable cover member 18 was provided to allow the enclosure 2 to be completely sealed when sanding was completed. To sand the three specimens the cover 18 was arranged in its up position as shown by the solid lines in FIG. 4. When sanding was completed, the cover 18 was pivoted downwardly to completely cover the access opening 16 as shown in phantom 18'.

As shown, three specimens of joint compound were prepared on a section of wallboard 20 and the section of wallboard 20 was clamped to a mounting block 22 arranged within the enclosure 2. When tested, the specimens were located about twelve inches above the bottom wall 8 of the enclosure. Each specimen was tested individually and after each test, the enclosure was cleaned so that the quantity of airborne dust particles measured less than 0.5 mg/m3. A particle counter 24 for measuring the quantity of airborne particles was mounted in the right side wall about forty eight inches above the center of the three specimens.

The power palm sander included a 4½×4.375-inch pad equipped with a 120-grit mesh sanding screen mounted over a 5×3½×¾ inch open, semi-rigid, non-woven, heavy duty, stripping, backing pad available from Minnesota Mining and Manufacturing Company, St. Paul Minn. Sanding was performed at a sanding speed of approximately 14,000 OPM (orbits per minute) using ordinary sanding pressure. Ordinary sanding pressure is defined as the amount of pressure typically required to sand a hardened joint compound. Sanding pressure, therefore, is the manual pressure typically applied by an ordinary person when sanding a joint compound. It will be recognized that the sanding pressure can vary depending on the hardness of the joint compound. Sanding was continued until the specimen was completely sanded. That is, the entire thickness of the specimen was sanded so that a generally smooth wall surface was produced. Care was taken to ensure that sanding was discontinued before the drywall itself was sanded. The amount of time required to sand each specimen varied depending on the hardness of the joint compound and the sanding pressure.

The quantity of airborne dust particles was measured starting from the time sanding was initiated until several minutes after sanding was discontinued. In general, the level of airborne dust was measured until the level decreased to less than 50% of its peak level. The quantity of airborne dust was measured using a DUSTTRAK™ aerosol monitor model 8520 available from TSI Incorporated, St. Paul, Minn. The particle counter measures the number of particles having a size of less than or equal to 10 microns. In the Examples, the peak or highest level of airborne dust measured during the test is presented. The test procedure for measuring the quantity of airborne particles generated when sanding the hardened joint compound is largely the same as described in U.S. Pat. No. 6,358,309, which is incorporated herein, by reference. In essence, a test specimen was prepared using each of the commercial products and formulations described above.

The DRA emulsion formulation is comprised of a microcrystalline wax, an emulsifier, usually a carboxylic acid or ester that can be saponified via a reaction with a base, and a stabilizer polyvinyl alcohol. Suitable emulsifiers were montan wax, rice wax, carnauba wax, and any such wax that is composed of a mixture of acids and esters. Standalone acids from $C_5$ to $C_{100}$, such as stearic acid, can also be used in place of the aforementioned natural waxes. Likewise, standalone esters of similar carbon atom chain length can also be used.

Suitable bases include any compound that is capable of saponifying the ester carboxylate group, or deprotonating the carboxylic acid proton. Suitable bases are inorganic basis such as potassium hydroxide and ammonium hydroxide. Likewise, suitable organic basis are monoethanol amine, diethanol amine, ad triethanol amine.

Two emulsions were prepared for comparison with the commercially available low-dust joint compounds. The first emulsion comprised a paraffin wax based core. The second emulsion, that of the invention, comprised a microcrystalline-wax based core with the CMWB microstructure.

When the inventive CMWB microstructure based emulsion was used as a dust reduction additive to the joint compound, the joint compound improved its dust reduction capability, over and above the simultaneous improvement in adhesion, over the paraffin-wax based emulsion.

The joint compound's ability to reduce dust is measured as peak airborne dust production in $mg/m^3$ units, and for the inventive joint compound of the present invention comprising the CMWB microstructure emulsion, the peak airborne dust (PAD) number is reduced by the following percentage numbers, depending upon the content of the CMWB microstructure-based dust reduction additive emulsion in the joint compound 10, 15, 20, 25, 30, 35, 40, 45, 50, 55, 60, 75, 80, 85%, 90% and 95%, and 98%. In some embodiments of the present invention the PAD number is reduced by a percentage residing in between a range defined by any two numbers above, including the endpoints of such range.

The wax emulsion was made by heating the emulsifier and the paraffin-wax in a vessel such that both become molten. In a separate vessel, a measured quantity of polyvinyl alcohol was mixed with water at room temperature after which the mixture was heated to about 180° F. The molten paraffin/montan mixture was then combined with the hot water/polyvinyl alcohol mixture which, upon passing through a charlotte mill, emerged as a stable wax emulsion where the polyvinyl alcohol was tethered to the paraffin surface, largely encapsulating the paraffin. A representative formula of the wax emulsion is shown in Table 7.

TABLE 7

Representative Formula of CMWB Microstructure Based Inventive Wax Emulsion

| Ingredient | Content % |
|---|---|
| Water | 60.3 |
| Polyvinyl alcohol | 3 |
| Microcrystalline wax | 33.5 |
| Montan wax | 3 |
| Monoethanol amine | 0.2 |
| Total Wt. | 100 |
| % Polyvinyl alcohol | 3.0% |
| % Paraffin | 33.5% |

Commercial Low Dust Joint Compounds

TABLE 8

Airborne Dust Generated by Commercial Low-Dust Joint Compounds

| Commercial Low Dust Joint Compound | Average Peak Airborne Dust ($mg/m^3$) |
|---|---|
| LaFarge Rapid Coat | 130 |
| Sheetrock Dust Control | 67 |
| ProForm DustTech | 74 |

Joint Compound with Inventive CMWB Microstructure-Based DRA Emulsion

TABLE 9

Joint Compound Formulations and Dust Generation

| Experiment No. Ingredient | Control 0% CMWB microstructure DRA emulsion | 1 2% CMWB microstructure DRA emulsion | 2 3.1% CMWB microstructure DRA emulsion | 3 4.7% CMWB microstructure DRA emulsion | 4 6.2% CMWB microstructure DRA emulsion |
|---|---|---|---|---|---|
| Preservatives | 0.2 | 0.2 | 0.2 | 0.2 | 0.2 |
| Polyether siloxane copolymer | 0.1 | 0.1 | 0.1 | 0.1 | 0.1 |
| Latex CPS 716 | 7.5 | 5.2 | 5.1 | 4.3 | 3.5 |
| Water | 37.9 | 38.1 | 37.6 | 37.3 | 37.0 |
| Wax emulsion | 0.0 | 2.0 | 3.1 | 4.7 | 6.2 |
| Cellulose ether | 0.6 | 0.6 | 0.6 | 0.6 | 0.6 |
| Attagel 30 clay | 2.0 | 2.0 | 2.0 | 1.9 | 1.9 |
| Mica 4K | 6.3 | 6.3 | 6.3 | 6.2 | 6.2 |
| Microwhite 100 calcium carbonate | 36.3 | 36.5 | 36.1 | 35.8 | 35.5 |
| Perlite, SilCel 43-34 | 9.1 | 9.1 | 9.0 | 8.9 | 8.9 |
| Peak Airborne Dust ($mg/m^3$) | 104 | 50 | 34 | 23 | 20 |

Five wax emulsions including one Control emulsion were prepared. The Control emulsion had 0% inventive emulsion comprising CMWB microstructures. Experiment 1 had 2%; Experiment 2 had 3.1%; Experiment 3 had 4.7%; and Experiment 4 had 6.2% wax emulsion included in the joint compound.

The Control sample generated approximately 104 mg/m$^3$ of peak airborne dust. With the addition of CMWB microstructure based inventive composition of the present invention, the peak airborne dust (PAD) production was reduced from 104 mg/m$^3$ to about 20 mg/m$^3$, for the 6% concentration of the CMWB emulsion as percentage of the joint compound weight. Even a mere 2% CMWB emulsion was able to reduce the PAD production from 104 mg/m$^3$ to 50 mg/m$^3$, which is a significant improvement in PAD generation. The commercial low dust compound LaFarge has a peak dust production number of 130 mg/m$^3$. Thus, at a 6% inclusion of CMWB, the peak airborne dust production was reduced by 85%. Similarly, the commercial low dust compounds Sheetrock Dust has a peak dust production 67 mg/m$^3$ and ProForm DustTech has a PAD production of 74 mg/m$^3$. Thus, at 6% inclusion of CMWB emulsion the PAD production was reduced by about 47% and 73%.

The comparative improvement in the PAD numbers at variety of CMWB microstructure based emulsions is provided in Table 9.1 below:

TABLE 9.1

PAD value Improvement in of the Inventive Composition over Commercial Products

| Comparative Commercial Low Dust Compound | Inventive Joint Compound CMWB based DRA emulsion content 0% | Inventive Joint Compound CMWB based DRA emulsion content 2% | Inventive Joint Compound CMWB based DRA emulsion content 3.1% | Inventive Joint Compound CMWB based DRA emulsion content 4.7% | Inventive Joint Compound CMWB based DRA emulsion content 6.2% |
|---|---|---|---|---|---|
| LaFarge Rapid Coat (130 mg/m3) | 20% | 61% | 74% | 82% | 85% |
| Sheetrock Dust Control (67 mg/m3) | −36% | 25% | 49% | 66% | 70% |
| ProForm DustTech (74 mg/m3) | −40% | 32% | 54% | 69% | 73% |

Thus, the CMWB microstructure based DRA emulsion based joint compound showed a significant and surprising peak airborne dust reduction compared to the control as well as the commercially available compounds.

Comparison of the CMWB Based DRA and Paraffin-Based DRA

In the next step, the paraffin-wax based microstructures were used to prepare the DRA emulsion. Such DRA emulsion was added to the joint compound in the same manner as described previously for the CMWB based dust reduction additive. The dust reduction additives prepared from the two waxes were added separately to joint compounds for testing. The CMWB (microcrystalline wax-based) joint compound showed reduced PAD values compared to the paraffin-wax based dust reduction additive in the joint compound (See FIG. 5).

Figure 5:
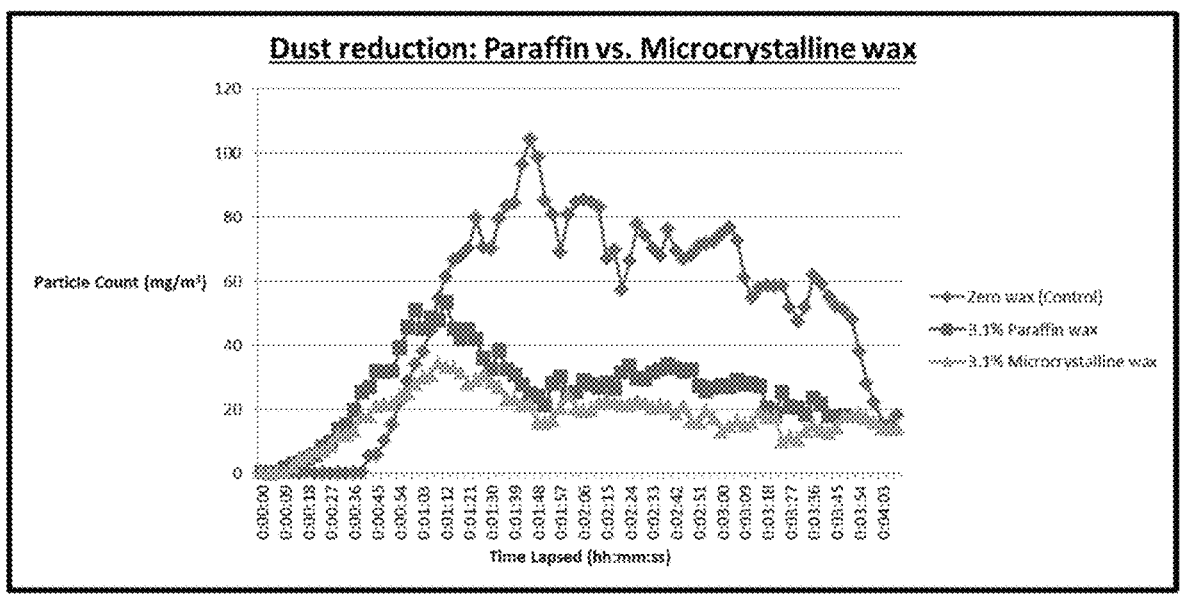
FIG. 5 shows comparison of air-borne numbers for a commercial sample, paraffin wax emulsion based dust reduction additive, and microcrystalline-wax based dust reduction additive.

The chart in FIG. 5 shows that at equivalent dosage (3.1%), microcrystalline-wax based emulsion as dust reduction additive in a joint compound is more effective at reducing dust than paraffin-wax based emulsion. The control joint compound sample which did not contain any PVOH stabilized wax emulsion, recorded a peak dust particle weight of 104 mg/m$^3$, upon sanding. The joint compound containing PVOH-stabilized paraffin-wax joint compound recorded a peak of 51 mg/m$^3$, while the PVOH-stabilized microcrystalline-wax joint compound recorded a peak of 34 mg/m$^3$, a 33% dust reduction efficiency over the paraffin-wax emulsion based dust reduction additive.

It is speculated that the largely amorphous nature of microcrystalline wax (it has very little crystalline content) translates into greater flexibility of the wax, which in turn enables it to stretch and be more efficiently distributed across a larger cross-sectional area during sanding. This greater coverage then enables the microcrystalline wax to attach onto fine particles across a wider area, causing more of them to drop rather than become airborne. In contrast, paraffin-wax is largely crystalline and therefore brittle. Its lack of flexibility restricts the cross-sectional area it is able to cover when sanding occurs, limiting its low dusting efficiency.

TABLE 9.2

| Comparative Commercial Low Dust Compound | Inventive Joint Compound CMWB based DRA emulsion content 3.1% (34 mg/m$^3$) | Inventive Joint Compound paraffin-wax based DRA emulsion content 3.1% (51 mg/m$^3$) |
|---|---|---|
| LaFarge Rapid Coat (130 mg/m$^3$) | 74% | 61% |
| Sheetrock Dust Control (67 mg/m$^3$) | 49% | 24% |
| ProForm DustTech (74 mg/m$^3$) | 54% | 31%% |

The CMWB microstructure based DRA emulsion that was created in the manner described in this work is comprised of a microcrystalline-wax particle that is surrounded by polyvinyl alcohol polymer chains that are chemically bound (via hydrogen bonding) to the surface of the microcrystalline-wax. The microcrystalline-wax is therefore largely encapsulated by polyvinyl alcohol. Stated differently, there is no substantially exposed microcrystalline-wax surface in this wax emulsion. The net effect of this is that, when added as a component of a joint compound formulation, this wax emulsion augments the low-dust character as well as adhesion and therefore necessitates the reduction in the formulation's overall binder content. Similarly, the paraffin-wax based DRA emulsion that was created in the manner described in this work is comprised of a paraffin-wax particle that is surrounded by polyvinyl alcohol polymer chains that are chemically bound (via hydrogen bonding) to the surface of the paraffin-wax. The paraffin-wax is therefore largely encapsulated by polyvinyl alcohol. Stated differently, there is no substantially exposed paraffin-wax surface in this wax emulsion. The net effect of this is that, when added as a component of a joint compound formulation, this paraffin-wax emulsion augments the low-dust character, water-resistance, as well as adhesion and therefore necessitates the reduction in the formulation's overall binder content.

In some embodiments, the disclosed joint compound can cover a joint or hole and provide dust reduction. Further, the joint compound is formulated to properly adhere to any boards that the compound is placed onto. With regards to adhesion, embodiments of the joint compound can have at least about 90%, 95%, 99%, or 100% bond according to an ASTM C474 peel test, hereby incorporated by reference in its entirety. Further, the joint compound can have adequate sag resistance, compatibility, and contact angle.

In some embodiments, the joint compound can provide water repellency. One indication of water repellency is the contact angle of a water droplet on the surface of the dried joint compound. A water droplet surface that has a contact angle of less than 90 degrees would generally be considered hydrophilic (the smaller the contact angle the greater the hydrophilicity). Conversely, surfaces that cause a water droplet to have a contact angle greater than 90 degrees are generally considered hydrophobic. Commercially available ready mix joint compound have contact angles of about zero degrees, meaning that a drop of water placed on such a surface will rapidly spread and wet out on the surface. Embodiments of the disclosed joint compound can have a contact angle greater than about 60, 70, 80, 90, 100, 110, 120, or 130. In some embodiments, the joint compound can have a contact angle between about 60 and 130, about 115 and 130, or about 118-120. Embodiments of the disclosed joint compound, containing a wax emulsion, can have an average contact angle of about 98 degrees (based on an average of six measurements), or greater than about 98 degrees, indicating a hydrophobic surface.

In some embodiments, the contact angle can be between about 60 to about 110 degrees, or about 60, about 70, about 80, about 90, about 100, or about 110 degrees.

In some embodiments, the contact angel can be any number selected from the following numbers in degrees: 60, 61, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, and 130.

Low-Dust Products

Embodiments of the disclosed wax emulsion can be used to form many different low-dust. For example, embodiments of the wax emulsion can be incorporated into building materials such as asphalt (e.g., comprising a viscous liquid or semi-solid form of petroleum), concrete (e.g., comprising aggregate or filler, cement, water, various chemical and/or mineral admixtures, etc.), stucco, cement (e.g., formed from or comprising calcium carbonate, clay, gypsum, fly ash, ground granulated blast furnace slag, lime and/or other alkalis, air entrainers, retarders, and/or coloring agents) or other binders. In some embodiments, the wax emulsion can be incorporated into concrete cover coat formulations, such as those used for filling, smoothing, and/or finishing interior concrete surfaces, drywall tape, bead embedment, skim-coating, and texturing drywall. Further, embodiments of the wax emulsion can be incorporated into concrete and/or cement mixtures as a dust reducing additive. Therefore, embodiments of the wax emulsion can be incorporated into pourable concrete and/or cement that can be used, for example, for foundations in home constructions. Additionally, embodiments of the wax emulsion can be used in cinder blocks as well as other similar concrete or cement based products. In some embodiments, a low-dust building material can be formed with cement, wax emulsion, and silicone, or siloxane, or siliconate, or fluorinated compound, or stearate, or combinations thereof.

Embodiments of the wax emulsion can also be incorporated into boards, such as cement boards (e.g., a relatively thin board, comprising cement bonded particle boards and cement fiber (e.g., comprising cement, fillers, cellulose, mica, etc.), which may be 0.25-0.5 inch thick or which may be thicker or thinner), and/or cement board formulations. Therefore, the wax emulsion can be used to provide additional dust reduction/of the boards, and.

From the foregoing description, it will be appreciated that inventive devices and approaches for low-dust/and wax emulsions have been disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination as well as in a single implementation. Conversely, various features that are described in the context of a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using and medical applications for the same will be apparent to those of skill in the art. Accordingly, it should be understood that various applications, modifications, materials, and substitutions can be made of equivalents without departing from the unique and inventive disclosure herein or the scope of the claims.

What is claimed:

1. A method of using a first low-dust[1], wall-repair compound composition that has low-dust property, said method comprising:
   (I) applying said wall-repair composition to a wallboard panel;
   (II) allowing said wall-repair composition to dry; and
   (III) sanding said dried wall-repair composition;
   wherein said wall-repair composition comprises a dust reduction additive emulsion comprising colloidally-protected micro-crystalline wax-based (CMWB) microstructure, wherein the CMWB microstructure comprises:
   (A) a wax core, wherein said wax core comprises a micro-crystalline wax component and optionally a non-micro-crystalline wax component, wherein said micro-crystalline wax component comprises at least one linear alkane wax defined by the general formula $C_nH_{2n+2}$, where n ranges from 13-80, wherein said non-micro-crystalline wax component comprises at least one wax selected from the group consisting of animal-based wax, plant-based wax, mineral wax, synthetic wax, a wax containing organic acids and/or esters, anhydrides, an emulsifier containing a mixture of organic acids and/or esters, and combinations thereof;
   (B) a polymeric shell, wherein said polymeric shell comprises at least one polymer selected from the group consisting of polyvinyl alcohol, polyvinyl alcohol copolymers, polyvinyl alcohol terpolymers, polyvinyl acetate, polyvinyl acetate copolymers, polyvinyl acetate terpolymers, cellulose ethers, polyethylene oxide, polethyleneimines, polyvinylpyrrolidone, polyvinylpyrrolidone copolymers, polyethylene glycol, polyacrylamides and poly(N-isopropylamides), pullulan, sodium alginate, gelatin, starches, and combinations thereof; and optionally
   (C) at least one compound selected from the group consisting of a silicone, a siliconate, a fluorinated compound, a stearate, or a combination thereof.

2. The method as recited in claim 1, wherein said first low-dust, wall-repair compound is a joint compound or a spackling compound.

3. The method as recited in claim 1, wherein the weight of said dust reduction additive emulsion is in the range of from about 0.1% to about 20% by weight of said first low-dust, wall-repair compound composition.

4. The method as recited in claim 3, wherein said first low-dust, wall-repair compound is a first joint compound or a first spackling compound.

5. The method as recited in claim 1, wherein said polymeric shell comprises polyvinyl alcohol.

6. The method as recited in claim 5, wherein said first low-dust, wall-repair compound is a first joint compound or a first spackling compound.

7. The method as recited in claim 1, wherein said dust-reduction additive emulsion further comprises a base and a dispersant.

8. The method as recited in claim 1, wherein the silicone, siliconate, fluorinated compound, or stearate are selected from the group consisting of metal siliconate salts, potassium siliconate, poly hydrogen methyl siloxane, polydimethyl siloxane, stearate-based salts, and combinations thereof.

9. The method as recited in claim 8, wherein said first low-dust wall-repair compound is a first joint compound or a first spackling compound.

10. The method as recited in claim 1, wherein the quantity of dust generated upon sanding of said first low-dust wall repair compound composition is reduced at least by 5% of the quantity of dust generated upon sanding of a second wall-repair compound composition having the same composition as said first low-dust, wall-repair compound, but not comprising said dust reduction additive emulsion.

11. The method as recited in claim 10, wherein said first low-dust, wall-repair compound is a first joint compound or a first spackling compound; and said second wall-repair compound is a second joint compound or a second spackling compound.

12. The method as recited in claim 1, wherein the quantity of dust generated upon sanding of said first low-dust wall repair compound composition is reduced at least by 80% of the quantity of dust generated upon sanding of a second wall-repair compound composition having the same composition as said first low-dust, wall-repair compound, but not comprising said dust reduction additive emulsion.

13. The method as recited in claim 12, wherein said first low-dust, wall-repair compound is a first joint compound or a first spackling compound; and said second wall-repair compound is a second joint compound or a second spackling compound.

14. The method as recited in claim 1, wherein the quantity of dust generated upon sanding of said first low-dust, wall-repair compound composition is reduced at least by 80% of the quantity of dust generated upon sanding of a second wall-repair compound composition having the same composition as said first low-dust, wall-repair compound, but not comprising said dust reduction additive emulsion.

15. The method as recited in claim 14, wherein said first low-dust, wall-repair compound is a first joint compound or a first spackling compound; and said second wall-repair compound is a second joint compound or a second spackling compound.

16. A method for reducing the quantity of dust generated by a wall-repair-compound composition, said method comprising the steps of:
(I) providing a first wall-repair-compound composition comprising a filler, a first water, a binder, and at least one of a defoamer, wetting agent, preservative, fungicide, thickener, non-leveling agent, surfactant, and a solvent;
(II) subsequently adding a sufficient quantity of a dust-reduction additive emulsion to said first wall-repair compound composition to reduce the quantity of dust generated by sanding the first wall-repair compound composition by at least 5% of the quantity of dust generated upon sanding of a second wall-repair compound composition having the same composition as said first wall-repair compound, but not comprising said dust reduction additive;
wherein said dust reduction additive emulsion comprises a colloidally-protected micro-crystalline wax-based (CMWB) microstructure, wherein the CMWB microstructure comprises:
(A) a wax core, wherein said wax core comprises a micro-crystalline wax component and optionally a non-micro-crystalline wax component, wherein said micro-crystalline wax component comprises at least one linear alkane wax defined by the general formula $C_nH_{2n+2}$, where n ranges from 13-80, wherein said non-micro-crystalline wax component comprises at least one wax selected from the group consisting of animal-based wax, plant-based wax, mineral wax, synthetic wax, a wax containing organic acids and/or esters, anhydrides, an emulsifier containing a mixture of organic acids and/or esters, and combinations thereof; and
(B) a polymeric shell, wherein said polymeric shell comprises at least one polymer selected from the group consisting of polyvinyl alcohol, polyvinyl alcohol copolymers, polyvinyl alcohol terpolymers, polyvinyl acetate, polyvinyl acetate copolymers, polyvinyl acetate terpolymers, cellulose ethers, polyethylene oxide, polethyleneimines, polyvinylpyrrolidone, polyvinylpyrrolidone copolymers, polyethylene glycol, polyacrylamides and poly(N-isopropylamides), pullulan, sodium alginate, gelatin, starches, and combinations thereof; and optionally
(C) at least one compound selected from the group consisting of a silicone, a siliconate, a fluorinated compound, a stearate, or a combination thereof;
(III) applying said first wall-repair composition to a wallboard panel;
(IV) allowing said first wall-repair composition to dry; and
(V) sanding said dried composition.

17. The method as recited in claim 16, wherein said first wall-repair compound is a first joint compound or a first spackling compound; and said second wall-repair compound is a second joint compound or a second spackling compound.

18. The method for as recited in claim 16, wherein the quantity of dust generated in the sanding step is reduced by at least 80% of the quantity of dust generated upon sanding of said second wall-repair compound composition having the same composition as said first wall-repair compound, but not comprising said dust reduction additive emulsion.

19. The method as recited in claim 18, wherein said first wall-repair compound is a first joint compound or a first spackling compound; and said second wall-repair compound is a second joint compound or a second spackling compound.

20. The method as recited in claim 18, wherein said first wall-repair compound is a first joint compound or a first spackling compound; and said second wall-repair compound is a second joint compound or a second spackling compound.

21. The method as recited in claim 12, wherein said first low-dust, wall-repair compound composition has a contact angle of from about 60° to about 150°;
wherein said first low-dust, wall-repair compound composition has a Cobb value of form about 5.0 to about 100 g/m²; or
wherein said first low-dust wall-repair compound composition has a contact angle of from about 60° to about 150° and a Cobb value of from about 5.0 to about 100 g/m².

22. The method as recited in claim 20, wherein said first low-dust wall-repair compound is a first joint compound or a first spackling compound.

* * * * *